(12) United States Patent
Jung et al.

(10) Patent No.: US 10,019,156 B2
(45) Date of Patent: Jul. 10, 2018

(54) MOBILE TERMINAL AND METHOD FOR CONTROLLING THE SAME

(71) Applicant: LG ELECTRONICS INC., Seoul (KR)

(72) Inventors: Juhyun Jung, Seoul (KR); Suhjin Yi, Seoul (KR); Daejin Kong, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/180,554

(22) Filed: Jun. 13, 2016

(65) Prior Publication Data

US 2017/0010807 A1 Jan. 12, 2017

(30) Foreign Application Priority Data

Jul. 8, 2015 (KR) .................... 10-2015-0097358

(51) Int. Cl.

| | | |
|---|---|---|
| *G06F 3/048* | (2013.01) | |
| *G06F 3/0488* | (2013.01) | |
| *G06F 1/16* | (2006.01) | |
| *G06F 3/041* | (2006.01) | |
| *G06F 3/0486* | (2013.01) | |
| *G06F 3/0481* | (2013.01) | |
| *G06F 3/0482* | (2013.01) | |
| *G06F 3/0484* | (2013.01) | |

(52) U.S. Cl.
CPC ........ *G06F 3/04886* (2013.01); *G06F 1/1626* (2013.01); *G06F 3/041* (2013.01); *G06F 3/0416* (2013.01); *G06F 3/0482* (2013.01); *G06F 3/0486* (2013.01); *G06F 3/04817* (2013.01); *G06F 3/04845* (2013.01); *G06F 3/04883* (2013.01); *G06F 2203/04803* (2013.01)

(58) Field of Classification Search
CPC ...... G06F 3/048–3/04886; G06F 2203/04803; G06F 17/3074–17/30749
See application file for complete search history.

(56) References Cited

U.S. PATENT DOCUMENTS

| | | | |
|---|---|---|---|
| 9,582,157 B1 * | 2/2017 | Chatterjee | ......... G06F 17/30781 |
| 2004/0095522 A1 | 5/2004 | Lee et al. | |
| 2010/0041442 A1 | 2/2010 | Hong | |
| 2011/0119611 A1 * | 5/2011 | Ahn | ...................... G06F 3/0346 |
| | | | 715/769 |

(Continued)

OTHER PUBLICATIONS

European Search Report dated Nov. 16, 2016 issued in Application No. 16174704.3.

*Primary Examiner* — Liliana Cerullo
(74) *Attorney, Agent, or Firm* — Ked & Associates, LLP

(57) ABSTRACT

The present disclosure relates to a mobile terminal having a single display unit consisting of a main region and an extended region, and a control method thereof. A mobile terminal according to an embodiment of the present disclosure may include a single display unit comprising a main region and an extended region formed to be extended in at least one direction of the main region, and a controller configured to control any content in a different mode based on a region to which a predetermined type of touch is applied among the main region and the extended region in a state that screen information associated with the any content is displayed on the display unit.

19 Claims, 42 Drawing Sheets

(56) References Cited

U.S. PATENT DOCUMENTS

2013/0002580 A1* 1/2013 Sudou .................... G06F 3/038
 345/173
2013/0076649 A1 3/2013 Myers et al.
2015/0015511 A1* 1/2015 Kwak .................. G06F 3/0416
 345/173

* cited by examiner (a)　　　　　　(b)

(a)

(b)

(c)

(a)

(b)

(c)

(a)     (b)

(c)

(a)  (b)

(a)    (b)

(c)

(a)  (b)

(c)

(a)    (b)

(c)

(a)　　　(b)

(c)

(a)            (b)

(a)  (b)

(d)  (c)

MOBILE TERMINAL AND METHOD FOR CONTROLLING THE SAME

CROSS-REFERENCE TO RELATED APPLICATION(S)

Pursuant to 35 U.S.C. § 119(a), this application claims the benefit of earlier filing date and right of priority to Korean Application No. 10-2015-0097358, filed on Jul. 8, 2015, the contents of which is incorporated by reference herein in its entirety.

BACKGROUND

1. Field

The present disclosure relates to a mobile terminal having a single display unit consisting of a main region and an extended region, and a control method thereof.

2. Background

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, various types of mobile terminals have been developed. In other words, mobile terminals having a rectangular shaped display unit in the related art have been widely available on the market, but in recent years, the development of more various types of display units has been actively carried out.

Accordingly, the need of development for a user experience (UX)/user interface (UI) applicable to various types of display units other than a rectangular shape has been increased.

SUMMARY OF THE INVENTION

An aspect of the present disclosure is to provide a mobile terminal having a display unit with a shape different from a rectangle, and a control method thereof.

Another aspect of the present disclosure is to provide a mobile terminal capable of controlling contents in an optimized method on a single display unit consisting of a main region and an extended region, and a control method thereof.

In order to accomplish the foregoing objectives, a mobile terminal according to an embodiment of the present disclosure may include a single display unit comprising a main region and an extended region formed to be extended in at least one direction of the main region, and a controller configured to control any content in a different mode based on a region to which a predetermined type of touch is applied among the main region and the extended region in a state that screen information associated with the any content is displayed on the display unit.

According to an embodiment, the controller may control the any content in a first mode based on the predetermined type of touch applied to the main region, and control the any content in a second mode different from the first mode based on the predetermined type of touch applied to the extended region.

According to an embodiment, screen information associated with a content different from the any content may be displayed on the display unit based on the predetermined type of touch applied to any one region of the main region and the extended region, and the controller may play back the different content instead of the any content when the predetermined type of touch is applied to the main region, and maintain the playback of the any content when the predetermined type of touch is applied to the extended region.

According to an embodiment, when the predetermined type of touch is applied to the extended region, the controller may display screen information associated with the different content in the main region and the extended region in a state that the playback of the any content is maintained.

According to an embodiment, when a drag touch started from the extended region and released from the main region is applied in a state that the any content is being played back and screen information associated with the different content is displayed in the main region and the extended region, the controller may suspends the playback of the any content and play back the different content.

According to an embodiment, screen information associated with a first content may be displayed in the main region, and screen information associated with a second content different from the first content may be displayed in the extended region.

According to an embodiment, the controller may control the display unit in a different mode based on a position from which a drag touch started from the extended region is released.

According to an embodiment, when the drag touch is released within the extended region, the controller may display screen information associated with a third content different from the second content instead of screen information associated with the second content displayed in the extended region in the extended region in a state that the display of screen information associated with the first content is maintained in the main region.

According to an embodiment, when the drag touch is released from a position out of the extended region, the controller may perform a different function based on a direction in which the drag touch is applied.

According to an embodiment, the controller may display screen information associated with the second content in the main region when the drag touch is applied in a first direction and then released from a position out of the extended region, and add the second content to a second playlist different from a first playlist which is a current playback object when the drag touch is applied in a second direction different from the first direction and then released from a position out of the extended region.

According to an embodiment, when a drag touch started from a position out of the extended region is applied in a direction opposite to the second direction and then released from the extended region, the controller may display screen information corresponding to the second playlist instead of screen information associated with the second content in the extended region.

According to an embodiment, when a drag touch started from the extended region is released from the main region in a state that screen information corresponding to the second playlist is displayed in the extended region, the controller may change the second playlist instead of the first playlist to a current playback object.

According to an embodiment, the any content may be at least one of a video and an image, and at least one content may be displayed in the main region, and when a drag touch started from any one content of the at least one content is released from the extended region, a thumbnail corresponding to the any one content may be displayed in the extended region.

According to an embodiment, when a drag touch started from the extended region is released from the main region in a state that at least one thumbnail is displayed in the extended region, the controller may display a content corresponding to the at least one thumbnail in the main region.

According to an embodiment, a content corresponding to at least one thumbnail displayed in the extended region may be grouped into one group.

According to an embodiment, the grouping may be carried out on an assumption that a drag touch started from the extended region is released from the main region.

According to an embodiment, when a drag touch started from the extended region is released from a region other than the extended region and the main region in a state that at least one thumbnail is displayed in the extended region, the controller may delete a content corresponding to the at least one thumbnail or limit the display of the at least one thumbnail based on a direction in which the drag touch is applied.

According to an embodiment, the controller may display at least one thumbnail the display of which is limited in the extended region based on a drag touch started from a position out of the extended region being released from the extended region in a state that the display of the at least one thumbnail is limited.

According to an embodiment, at least one thumbnail the display of which is limited may be displayed in the extended region on an assumption that user authentication is successful.

A method of controlling a mobile terminal according to an embodiment of the present disclosure may include displaying screen information associated with any content in a main region and an extended region formed to be extended in at least one direction of the main region on a display unit, and controlling the any content in a different mode based on a region to which a predetermined type of touch is applied among the main region and the extended region, wherein the controlling step controls the any content in a first mode based on the predetermined type of touch applied to the main region, and controls the any content in a second mode different from the first mode based on the predetermined type of touch applied to the extended region.

The above references are incorporated by reference herein where appropriate for appropriate teachings of additional or alternative details, features and/or technical background.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
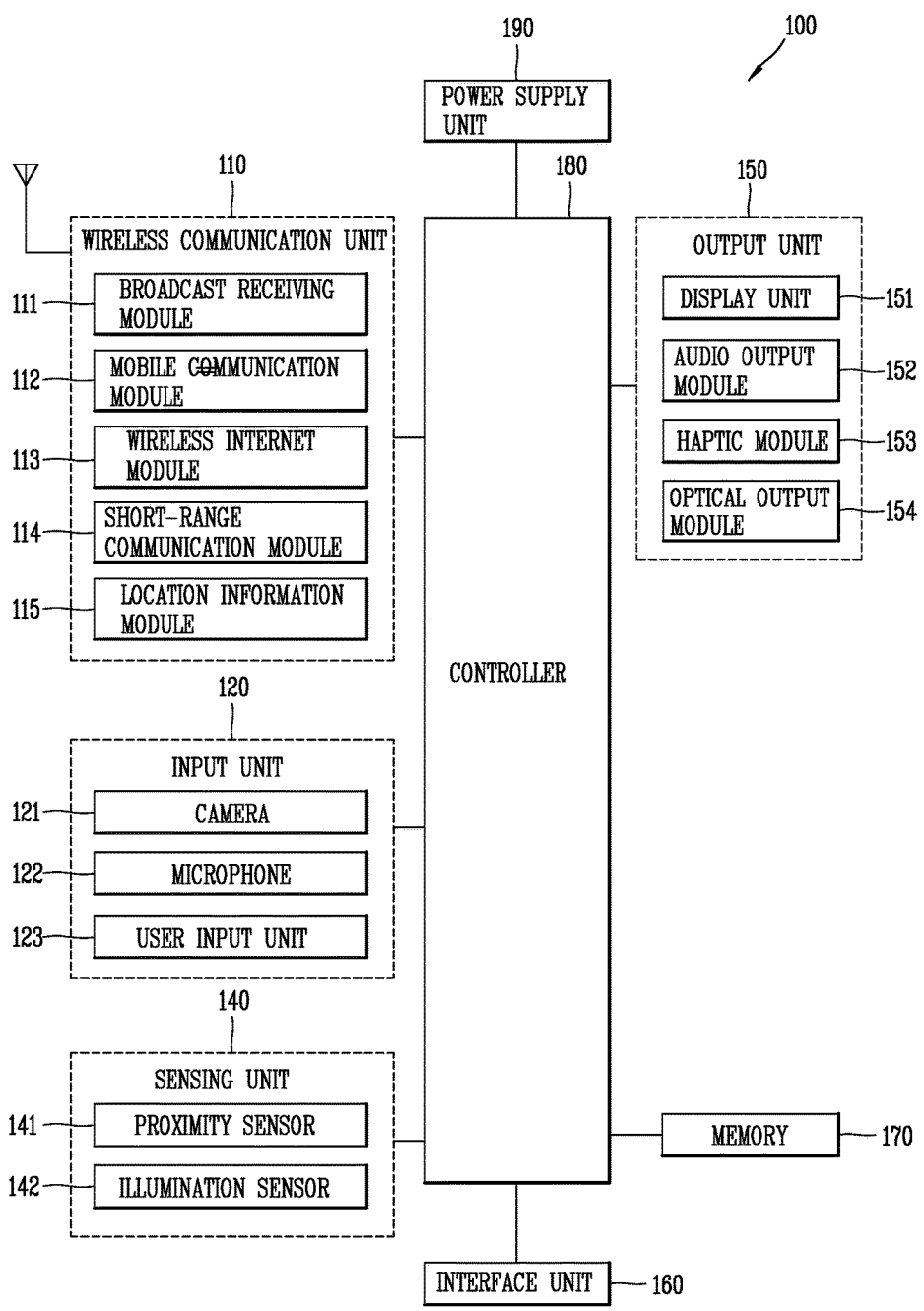
FIG. 1A is a block diagram for explaining a mobile terminal associated with the present disclosure.
Figure 1B:
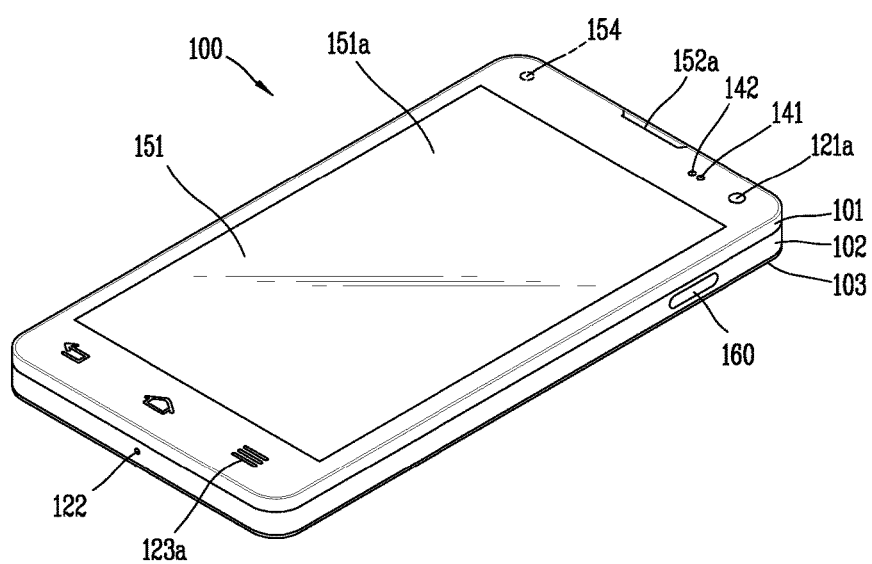
FIGS. 1B and 1C are conceptual views illustrating an example in which a mobile terminal associated with the present disclosure is seen from different directions.
Figure 1C:
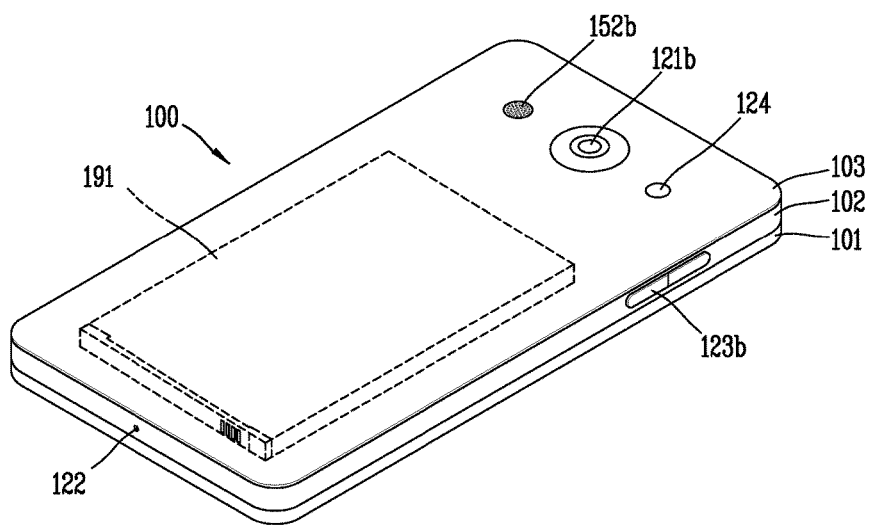

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects that the user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal may include a display unit 151, first and second audio output modules 152*a* and 152*b*, a proximity sensor 141, an illumination sensor 152, an optical output module 154, first and second cameras 121*a* and 121*b*, first and second manipulation units 123*a* and 123*b*, a microphone 122, an interface unit 160 and the like.

Hereinafter, description will be given of an exemplary mobile terminal 100 that the display unit 151, the first audio output module 152*a*, the proximity sensor 141, the illumination sensor 142, the optical output module 154, the first camera 121*a* and the first manipulation unit 123*a* are disposed on the front surface of the terminal body, the second manipulation unit 123*b*, the microphone 122 and the interface unit 160 are disposed on a side surface of the terminal body, and the second audio output module 152*b* and the second camera 121*b* are disposed on a rear surface of the terminal body, with reference to FIGS. 1B and 1C.

Here, those components may not be limited to the arrangement, but be excluded or arranged on another surface if necessary. For example, the first manipulation unit 123*a* may not be disposed on the front surface of the terminal body, and the second audio output module 152*b* may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

Figure 2:
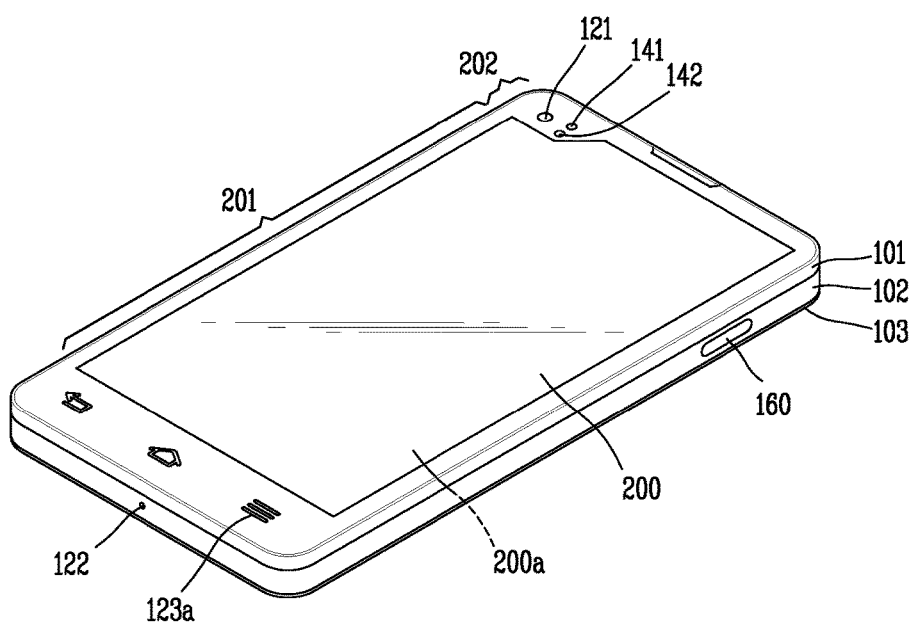
FIG. 2 is a conceptual view in which a mobile terminal applicable to the present disclosure is seen from a front side.

FIG. 2 is a conceptual view in which a mobile terminal applicable to the present disclosure is seen from a front side.

As illustrated in FIG. 2, a mobile terminal according to the present disclosure is provided with at least one or more display regions independently activated (implemented) within a single display unit (or display panel) 200 to form a window 200a. In the aspect of independently activating/deactivating a partial region thereof, the display unit 200 has a different structure from that of the display unit 151 in which the entire region thereof is activated/deactivated at the same time.

In other words, the display unit 200 has a structure in which one side thereof illustrated in FIG. 1B is extended in a predetermined direction, for example, in an upward direction. Though only an example in which one side thereof is extended in an upward direction is disclosed in FIG. 2, for the sake of convenience of explanation, the present disclosure may not be necessarily limited to this, and may be also extended in a horizontal, lateral or downward direction.

A first region 201 on the display unit 200 as a main region corresponds to the display unit 151 in FIG. 1B, and a second region 202 corresponds to an extended region. The two regions 201, 202 may be independently controlled by the controller 180. The extended region 202 may have a different shape and size from that of the main region 201.

Accordingly, according to the circumstances, the present disclosure may selectively activate one of the two regions 201, 202, thereby reducing power consumption.

Typical image information may be displayed in the main region 201, and an event occurrence may be displayed or a status bar may be displayed in the extended region 202, and additional information may be displayed therein according to the type of an application displayed in the main region 201. In particular, status information may be displayed in the extended region when the main region 201 is in an inactive state (off state), and the status information may be displayed at an upper portion of the main region when the main region 201 is in an active state (on state).

Accordingly, when it is controlled that the main region 201 is deactivated and the extended region 202 is activated in a state that a user does not use the terminal, the user may check a status or newly occurred event of the mobile terminal through the extended region 202.

The extended region 202 may be formed to be less than or equal to a horizontal or vertical length of the main region 201 as illustrated in the drawing. According to the present disclosure, an example is given that a horizontal length of the extended region 202 is less than a horizontal length of the main region 201. In this case, the camera 121, proximity sensor 141 and illumination sensor 142 that have been located an upper side of the display unit 151 in FIG. 1B may be disposed at the left side of the extended region 202 as illustrated in FIG. 2.

When a horizontal length of the extended region 202 is formed to be less than that of the main region 201, at least one side thereof may be formed in one of a rectangular shape, an inclined surface and a curved surface. In FIG. 2, one side thereof forms an inclined surface.

The display unit 200 as a display panel is largely divided into a liquid crystal panel and a backlight unit. The backlight unit plays the role of uniformly providing light provided from a light source in a front direction of the display unit 200, and includes the light source, a light guide plate, a polarizing plate, a diffusion plate, and a reflection plate.

Figure 3A:
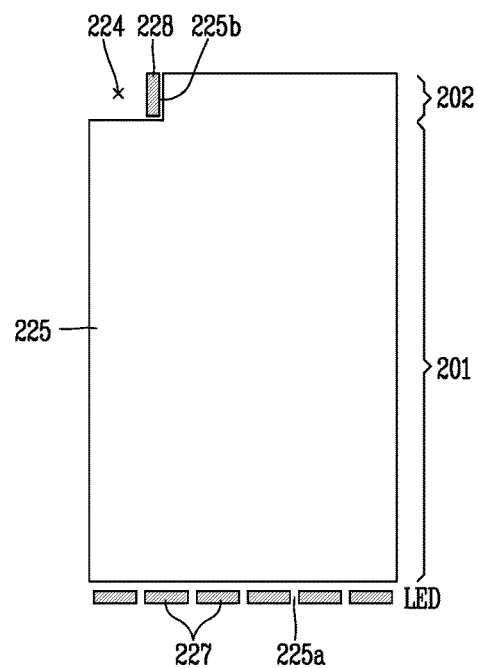
FIGS. 3A and 3B are front views illustrating a light guide plate and a light source constituting a display unit 200 according to the present disclosure.
Figure 3B:
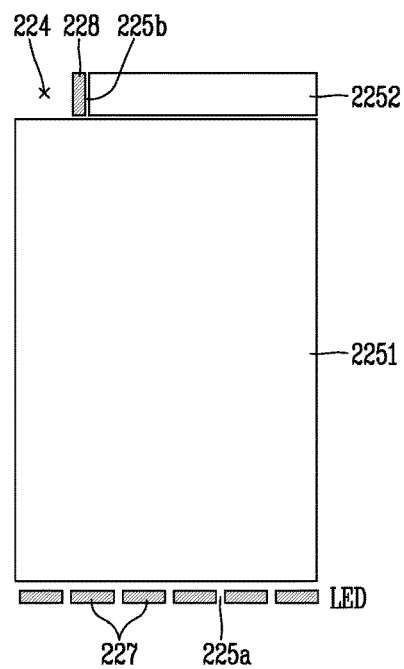

FIGS. 3A and 3B are front views illustrating a light guide plate and a light source constituting a display unit 200 according to the present disclosure.

As illustrated in FIG. 3A, light sources 227, 228 are disposed at a lateral surface of the light guide plate 225 to supply light to a lateral surface of the light guide plate 225, and the light guide plate 225 diffuses light supplied from the light sources 227, 228 using a total reflection property within the light guide plate 225. Total reflection is a property of emitting light from the light guide plate 225 only when light incident to the lateral surface is entered above a critical angle, wherein light incident to a lateral surface is entered above a critical angle and totally reflected and diffused within the light guide plate 225 and emitted from the light guide plate 225 when bent at an angle within the critical angle. Here, the main light source 227, the auxiliary light source 228 and the light guide plate 225 are illustrated in the drawing.

The backlight unit 220 supplies light to the light guide plate 225 through light sources located in two directions contrary to the related art. For example, a plurality of main light sources 227 disposed in parallel along a first lateral surface 225a of the light guide plate 225 may uniformly supply light over the entire light guide plate 225. The auxiliary light source 228 located at a second lateral surface 225b perpendicular to the first lateral surface 225a of the light guide plate 225 may supply light to part of the light guide plate 225.

The main light source 227 and auxiliary light source 228 may be independently driven to control that only the auxiliary light source 228 is turned on in a state that the main light source 227 is turned off.

Figure 4:
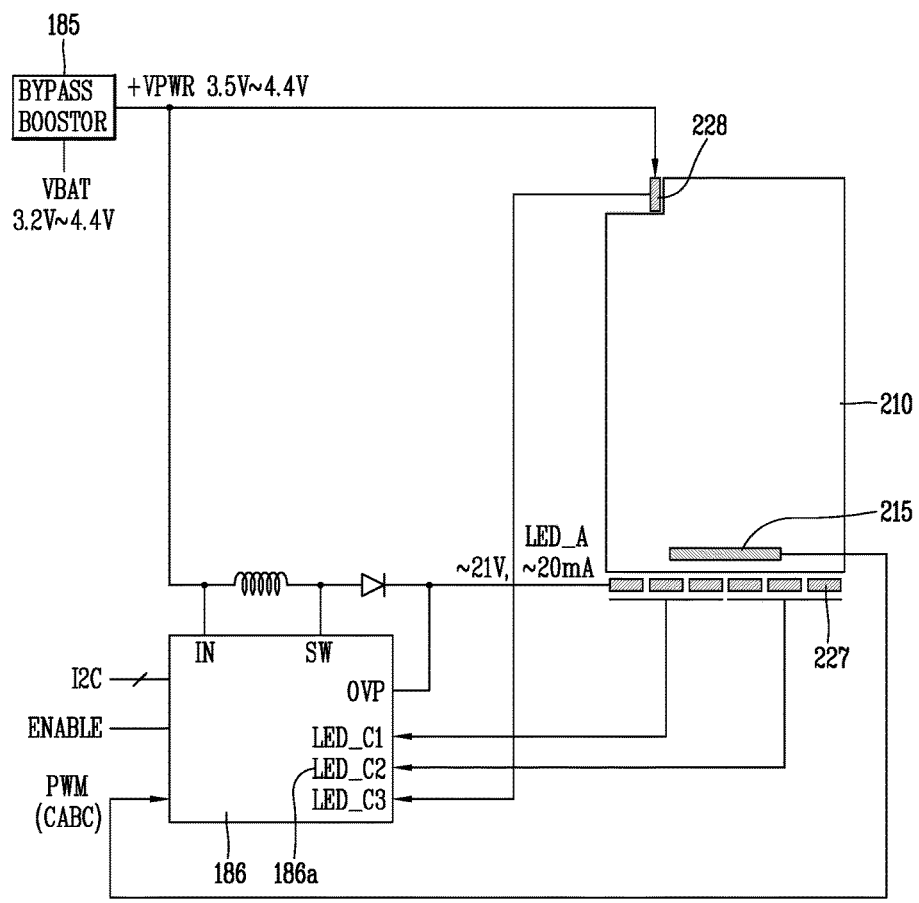
FIGS. 4 and 5 are an IC circuit for controlling a main light source 227 and an auxiliary light source 228.
Figure 5:
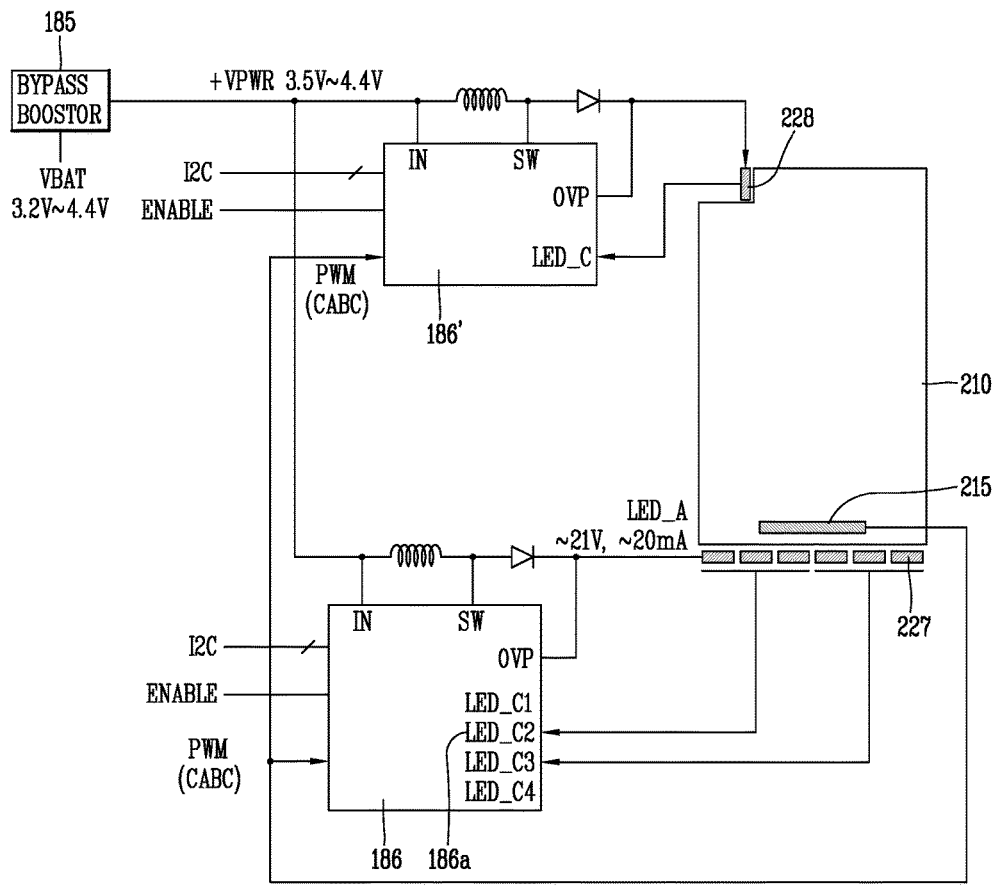

FIGS. 4 and 5 are an IC circuit for controlling the main light source 227 and auxiliary light source 228.

An IC circuit illustrated in FIG. 4 is configured in such a manner that one backlight IC 186 controls the main light source 227 and auxiliary light source 228, and an IC circuit illustrated in FIG. 5 is configured in such a manner that two backlight ICs 186 controls the main light source 227 and auxiliary light source 228, respectively.

A power source (VBAT) supplied from the power supply unit 190 is noise-removed through a bypass booster 185 and input to the backlight IC 186. The backlight IC 186 controls the light sources 227, 228 to emit light. The backlight IC 186 finds an optimal backlight brightness for displaying the relevant image based on the low data information of an image received from a drive IC 215 of the liquid crystal panel to adjust the brightness of each LED (Content Adaptive Brightness Control (CABC)).

When one backlight IC 186 is used, the present disclosure may use one more LED channel 186a to control the auxiliary light source 228 (FIG. 4), and further include an additional backlight IC 186' to separately control the auxiliary light source 228 (FIG. 5).

The plurality of main light sources 227 may be provided in parallel adjacent to the first lateral surface 225a to supply light to the entire light guide plate 225, but one or two auxiliary light sources 228 having a smaller number than that of the main light sources 227 may be provided to supply light only to part of the light guide plate 225.

The present disclosure may include a first light guide plate 2251 configured to emit light supplied from the main light source 227 to a front surface of the display unit 200 and a second light guide plate 2252 configured to emit light supplied from the auxiliary light source 228 to a front surface of the display unit 200 as illustrated in FIG. 3B.

When the light guide plate 225 is configured as an integral type as illustrated in FIG. 3A, the main light source 227 may supply light to the second region 202 as well as the first region 201. As a result, it has an advantage in which when the main light source 227 is turned on, the auxiliary light source 228 is not required to be turned on, and an image may be displayed over the second region 202 and first region 201.

On the other hand, when the light guide plate 225 is configured as a separable type as illustrated in FIG. 3B, the light of the main light source 227 is supplied only to the first region 201 through the first light guide plate 2251, and the light of the auxiliary light source 228 is supplied only to the second region 202 through the second light guide plate 2252. The auxiliary light source 228 should be driven to display information in the second region 202 even in a state that the main light source 227 is turned on, but light is not supplied to the first region 201 when information is displayed only in the second region 202, and thus an image with a high brightness may be provided using a smaller number of light sources (LED lamps).

The main light source 227 and auxiliary light source 228 may be connected to a main board in a merged manner or individually connected to the main board in a separate manner. Accordingly, according to the present disclosure, independently controlling the main region 201 and extended region 202 denotes that the controller 180 independently controls the main light source 227 and auxiliary light source 228.

The auxiliary light source 228 may be located at the second lateral surface 225b, thereby increasing the size of a bezel of the second lateral surface 225b. An increase of the bezel size due to the auxiliary light source 228 may not be a big problem in case of a large-sized display unit, but the bezel size may be a very important factor in determining the size of the entire product in a small-sized terminal.

Accordingly, according to the present disclosure, in order to prevent an increase of the bezel size in a lateral direction, the second lateral surface 225b of the light guide plate 225 at which the auxiliary light source 228 is located may be formed in a concave manner to form a dent 224. The auxiliary light source 228 may be located at the dent 224, thereby preventing the bezel size from being increased in a lateral direction.

On the other hand, an liquid crystal panel 210 constituting the display unit 200 has a similar size to that of the light guide plate 225. In other words, when the light guide plate 225 has a dent 224, the dent is formed on the same location.

According to the present disclosure, the light guide plate 225 may be divided into a portion corresponding to the main region 201 and a portion corresponding to the extended region 202, but the liquid crystal panel is provided with one unit and controlled by one drive IC. The drive IC is connected to a main board through a flexible board to apply power for each pixel according to an image signal received from the main board so as to adjust the alignment of liquid crystal molecules.

The liquid crystal panel is a device of selectively applying power for each pixel to change the alignment of liquid crystal molecules and display a different color for each pixel, thereby configuring an image. The display unit 200 configured with such a liquid crystal panel and a backlight unit may be disposed on a front surface of the mobile terminal 100 to display information according to the control of the controller 180 as illustrated in FIG. 2.

Figure 6:
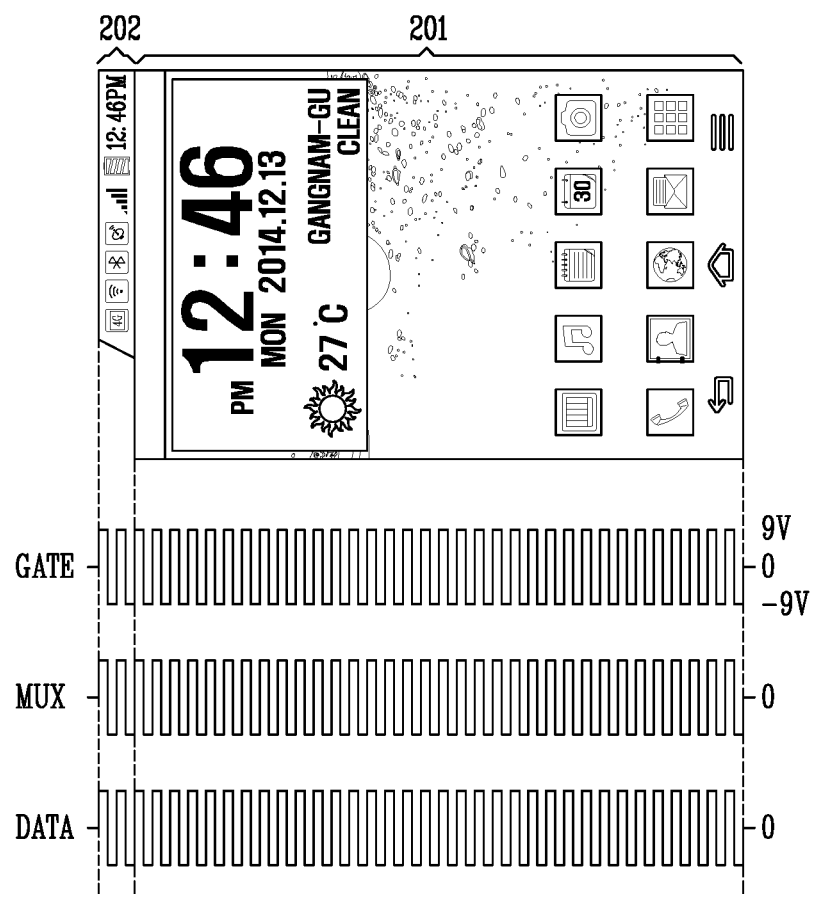
FIGS. 6 and 7 are views illustrating the waveforms of signals applied to an liquid crystal panel of a mobile terminal according to the present disclosure.
Figure 7:
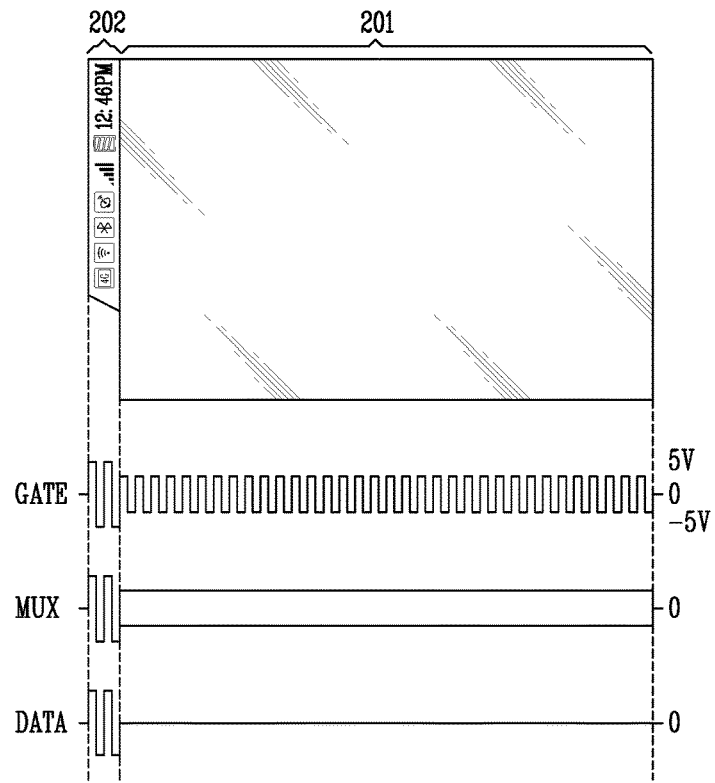

FIGS. 6 and 7 are views illustrating the waveforms of signals applied to a liquid crystal panel of a mobile terminal according to the present disclosure.

The present disclosure may define an operation mode according to the type of driving the main region 201 and extended region 202. A first mode is a mode in which both the main region and extended region (201, 202) are in an active state, and a second mode is a mode in which only the extended region 202 is in an active state.

As illustrated in FIG. 6, in the first mode, the drive IC transmits a gate signal (GATE), a multiplexer signal (MUX) and a data signal (DATA) to the liquid crystal panel to activate both the main region and extended region. The gate signal performs the role of determining a threshold voltage of a thin film transistor (FET) for each pixel. Accordingly, a data voltage above a predetermined voltage should be applied to the gate to change the alignment of liquid crystal molecules so as to display an image.

A multiplexer is disposed between the drive IC and each transistor. The gate signal (GATE) and data signal (DATA) are transferred through the multiplexer, and the transferred signals (GATE, DATA) are sequentially redistributed and supplied to each transistor.

The gate signal is comprised of a gate clock and a shift-resistor, and the shift-resistor performs the operation of receiving a clock to transfer data to the next gate. The data signal is a signal for driving the liquid crystal panel according to color information for each pixel, and a voltage larger than that of the gate signal is applied to a portion at which the alignment of liquid crystal molecules should be changed to transmit light supplied from the backlight unit in a front direction.

On the other hand, as illustrated in FIG. 7, in the second mode, the drive IC transfers only the gate signal (GATE), multiplexer signal (MUX) and data signal (DATA) corresponding to the extended region 202 to activate only the extended region 202.

However, the gate signal (GATE) should be applied even to the main region 201 for synchronization at predetermined intervals. However, since the data signal is not applied to the main region 201, the size of the gate signal may be set to a small value. For example, a gate signal of ±9 V may be used for the extended region 202, and a gate signal of ±5 V may be used for the main region 201 to change the alignment of liquid crystal molecules.

A mobile terminal including at least one of the foregoing constituent elements may display (reproduce) contents. Here, the contents may include a text, a document (document data), music (music data), a moving image (video data), an image (still image), a voice (voice data), contact data and screen information (or image information) provided by various applications, and the like, for an example.

The contents may be output to the display unit 200 (refer to FIG. 2) and the audio output unit 152 (refer to FIG. 1A) according to the user's control command. For example, when the content corresponds to an image, the corresponding image may be displayed on the display unit 200, and when the content corresponds to a video, the screen information of the corresponding video may be displayed on the display unit 200 and the audio information of the corresponding video may be output to the audio output unit 152.

On the other hand, screen information associated with contents may be displayed on the display unit 200 included in the mobile terminal. Specifically, screen information associated with contents may be displayed on at least one of the first region 201 included in the display unit 200 and the extended region 202 formed to be extended in at least one direction of the main region.

Here, screen information associated with contents displayed in the main region 201 and extended region 202 may be one screen information or different screen information associated with the relevant contents. Furthermore, when screen information associated with the relevant contents is displayed only in either one of the main region 201 and extended region 202, screen information non-associated with the relevant contents may be displayed or deactivated in the remaining region.

A mobile terminal according to the present disclosure may control various contents in various ways using a single display unit including the main region 201 and extended region 202.

Hereinafter, a method of controlling contents in various ways according to the present disclosure will be described in more detail with reference to the accompanying drawings.

Figure 8:
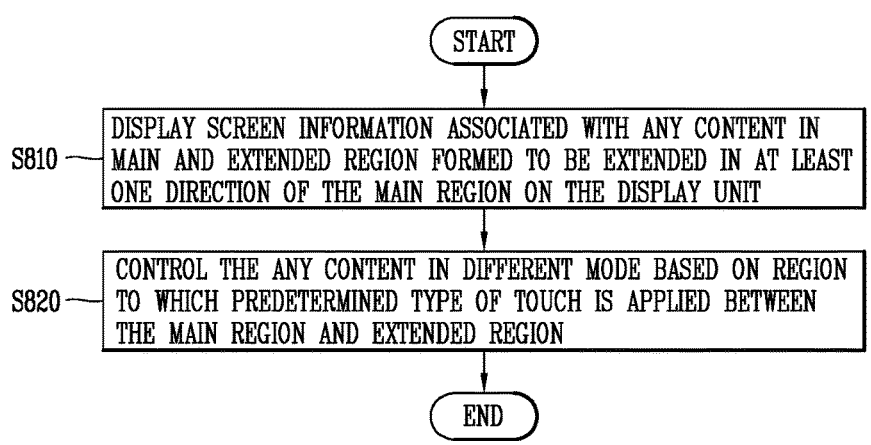
FIG. 8 is a flow chart representatively illustrating a control method of the present disclosure.
Figure 9A:
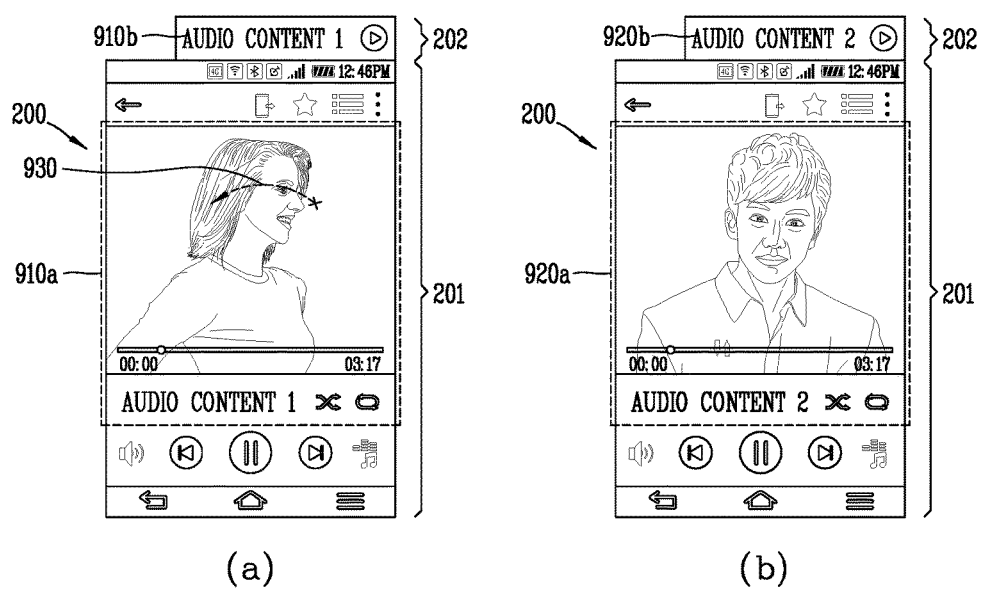
FIGS. 9A, 9B and 9C are conceptual views for explaining the control method illustrated in FIG. 8.
Figure 9B:
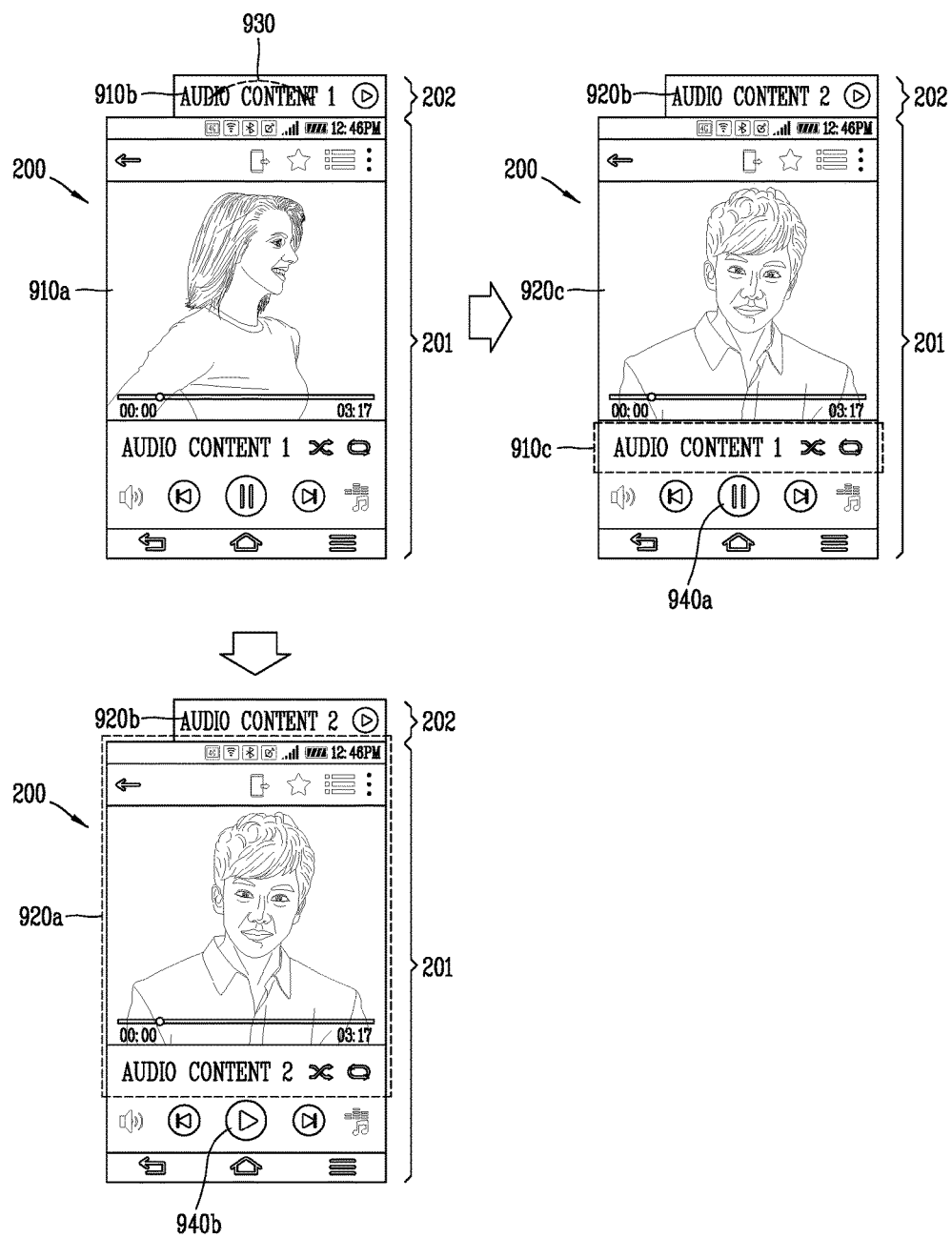
Figure 9C:
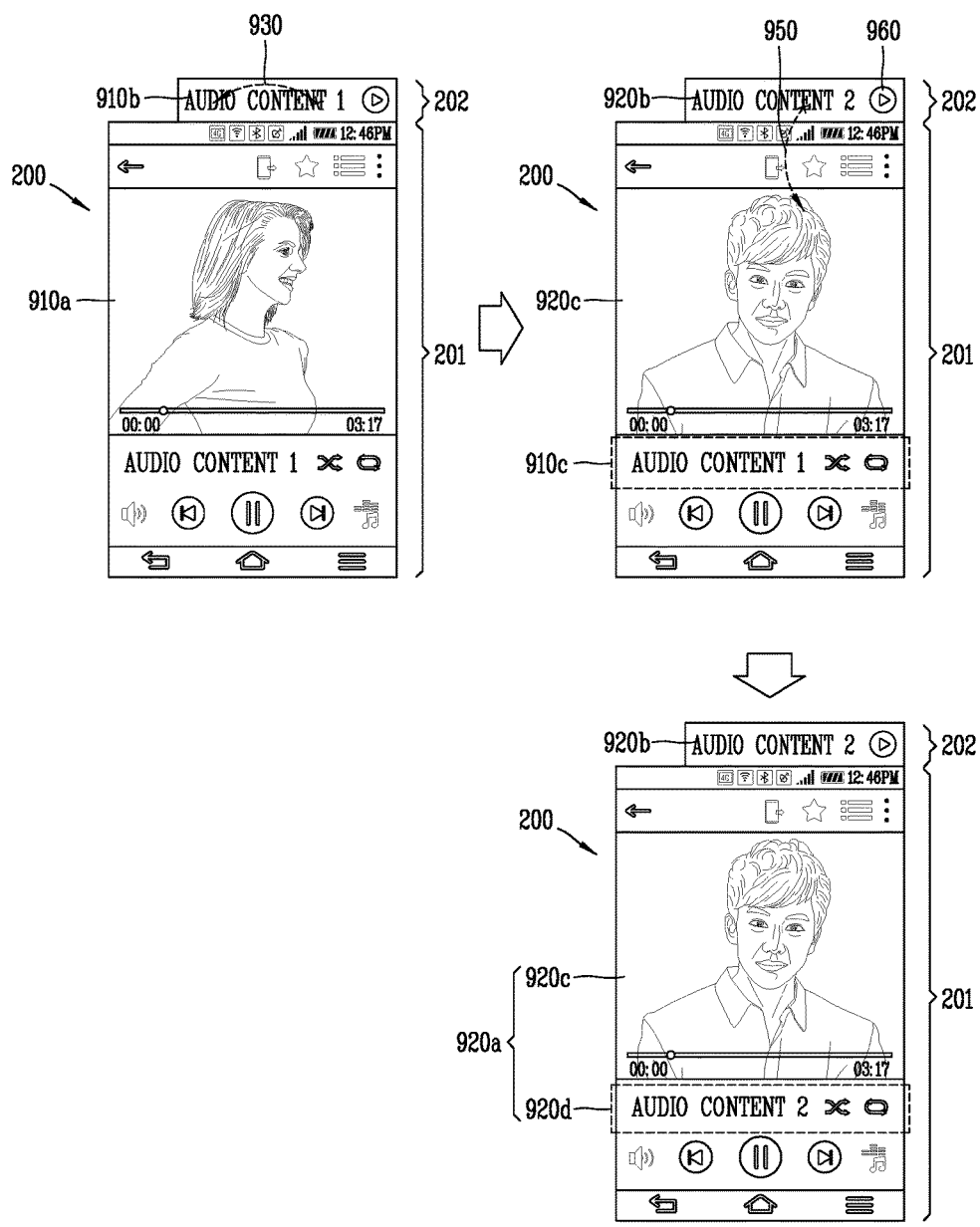

FIG. 8 is a flow chart representatively illustrating a control method of the present disclosure, and FIGS. 9A, 9B and 9C are conceptual views for explaining the control method illustrated in FIG. 8.

First, according to the present disclosure, the process of displaying screen information associated with any content in the main region 201 of the display unit 200 and the extended region 202 formed to be extended in one direction of the main region is carried out (S810). The any content may include a text, a document (document data), music (music data), a moving image (video data), an image (still image), a voice (voice data), contact data and screen information (or image information) provided by various applications, and the like as described above.

The any content may be stored in the memory 170 of the mobile terminal or received in real time from an external server/the Internet or the like. For example, the controller 180 may receive any content in a streaming mode from the external server/the Internet or the like, and display screen information associated with the received any content on the display unit 200.

Hereinafter, for the sake of convenience of explanation, an example in which the content corresponds to music (music data) will be described.

Screen information associated with the any content may be displayed on the display unit 200 based on a user request. The user request may denote a user control command or denote the execution of an application associated with the any content. The application may be carried out based on the touch (or selection) of an icon (or graphic object) of the application For example, as illustrated in FIG. 9A(a), when a music related application is carried out, screen information associated with any content (music) may be displayed in the main region 201 and extended region 202 of the display unit 200.

As illustrated in FIG. 9A, screen information 910a displayed in the main region 201 and screen information 910b displayed in the extended region 202 are different from each other. It is because the size and shape of the main region 201 and extended region 202 are formed in a different manner. However, both screen information 910a displayed in the main region 201 and screen information 910b displayed in the extended region 202 may be screen information associated with any content.

For example, when the any content is "audio content 1," an image (for example, album jacket image) linked to the audio content 1 and a title of the audio content 1, and the like may be displayed in at least part of the main region 201. Furthermore, various icons (or buttons, graphic objects) associated with music playback, for example, an icon linked to an audio volume adjust function, an icon linked to a previous music playback button, a playback/stop button, a next music playback button or a list display function, an icon linked to a function of continuously playing back a plurality of contents (music) included in only one song/play list, an icon linked to a function of sequentially or randomly playing back a plurality of contents (music) included in a play list or the like, may be displayed in the main region 201.

Furthermore, when the any content is "audio content 1," a title of the audio content 1, a title of audio content 2 expected to be played back next to the audio content 1, and the like in the extended region 202. Furthermore, the extended region 202 may include at least one of various icons associated with music playback as described above.

Then, according to the present disclosure, the process of controlling the any content in a different mode based on a region to which a predetermined type of touch is applied among the main region and the extended region is carried out.

Specifically, the any content may be controlled in a first mode based on the predetermined type of touch applied to the main region 201. Furthermore, the controller 180 may control the any content in a second mode different from the first mode based on the predetermined type of touch applied to the extended region 202.

The predetermined type of touch may be various types of touches for controlling any content in various ways.

For example, the various types of touches may include a short (or tap) touch, a long touch, a double touch, a multi touch, a drag touch, a flick touch, a pinch-in touch, a pinch-out touch, a swype touch, a hovering touch, and the like. A function of controlling any content in a specific manner may be linked to the foregoing various types of touches, respectively.

Hereinafter, the various types of touches will be described in more detail.

A short (or tap) touch may be a touch in which a touch subject (for example, a finger, a stylus pen, etc.) is in contact with the display unit 200 (or a touch is applied) and then released within a predetermined period of time. For example, the short (or tap) touch may be a touch in which a touch subject is in contact with the touch screen for a short period of time like a single click of mouse.

A long touch may be a touch in which a touch subject is in contact with the display unit 200 and then maintained for more than a predetermined period of time. For example, the long touch may be a touch in which a touch is applied to the display unit 200 by a touch subject and then the touch is maintained for more than a predetermined period of time. More specifically, the long touch may be a touch in which the touch is maintained at one position on the touch screen for a predetermined period of time and then released therefrom. Furthermore, the long touch may be understood as a touch corresponding to a touch-and-hold operation in which the contact state of a touch subject is maintained on the display unit 200 for more than a predetermined period of time.

A double touch may be a touch in which the short touch is consecutively applied to the display unit 200 at least twice within a predetermined period of time.

A predetermined period of time described in the short touch, long touch and double touch may be determined by user's setting A multi touch may be a touch being applied to at least two contact positions on the display unit 200 at substantially the same time point.

A drag touch may be a touch in which a contact started from a first position of the display unit 200 is consecutively applied on the touch screen along one direction and then the contact is released from a second position different from the first position.

Specifically, the drag touch may be a touch applied to one position of the display unit 200 by a touch subject being consecutively extended while being maintained on the display unit 200 and then released from a position different from said one position.

Furthermore, the drag touch may denote a touch in which the touch is applied to one position of the display unit 200 and then consecutively extended from the touch.

A flick touch may be a touch in which the drag touch is applied within a predetermined period of time. Specifically, the flick touch may be a touch in which a touch subject applying the drag touch is released from the display unit 200 within a predetermined period of time. In other words, the flick touch may be understood as a drag touch applied at a speed above a predetermined speed.

A swype touch may be a drag touch applied in a straight line.

A pinch-in touch may be a touch in which at least one of a first and a second touch applied to different two positions (separate two positions) on the display unit 200 is extended in a direction closer to each other. For example, the pinch-in touch may be a touch implemented by an operation of decreasing a distance between two fingers in a state that the fingers are in contact with separate two positions, respectively, on the display unit 200.

A pinch-out touch may be a touch in which at least one of a first and a second touch applied to different two positions (separate two positions) on the display unit 200 is extended in a direction away from each other. For example, the pinch-out touch may be a touch implemented by an operation of increasing (extending) a distance between two fingers in a state that the fingers are in contact with separate two positions, respectively, on the display unit 200.

A hovering touch may be a touch corresponding to the operation of a touch subject in a space away from the display unit 200 while the touch subject is not in contact with the display unit 200, and for an example, may be a proximity touch as illustrated in FIG. 1A. For example, the hovering touch may be a touch corresponding to an operation in which the touch subject is maintained at one position separated from the display unit 200 for more than a predetermined period of time.

According to the present disclosure, it will be described that the preset type of touch is a drag touch, for example. However, the foregoing various types of touches will be analogically applied to the preset type of touch in the same or similar manner.

Returning to the subject again, the controller 180 may control any content in a different mode based on a region to which a predetermined type of touch is applied among the main region 201 and the extended region 202 on the display unit 200.

For example, when a predetermined type of touch (for example, drag touch 930) is applied to the main region 201 in a state that any content is being played back (or in a state that screen information 910*a*, 910*b* associated with the any content is displayed on the display unit 200) as illustrated in FIG. 9A(a), the controller 180 may play back a different content instead of the any content as illustrated in FIG. 9A(b).

At this time, as illustrated in FIG. 9A(b), screen information 920*a* associated with the different content instead of screen information 910*a* associated with the any content may be displayed in the main region 201 based on the predetermined type of touch 930 applied to the main region 201. Screen information 920*b* associated with the different content may be also displayed in the extended region 202.

Here, the different content may vary based on a direction in which the predetermined type of touch 930 (for example, drag touch) is applied. For example, when the drag touch is applied in one direction (for example, left direction), the controller 180 may play back a content to be displayed next to any content. For another example, when the drag touch is applied in a direction (for example, right direction) opposite to said one direction, the controller 180 may play back a content that has been played back prior to any content.

Here, playing back a content should be taken as a meaning including displaying screen information associated with the content on at least part of the display unit 200, displaying screen information associated with the content in at least one of the main region 201 and extended region 202 on the display unit 200, and outputting audio information included in the content through the audio output unit 152, and the like.

On the other hand, when a predetermined type of touch 930 (for example, drag touch) is applied to the extended region 202 other than the main region 201 in a state that any content is being played back (or in a state that screen information 910*a*, 910*b* associated with the any content is displayed on the display unit 200) as illustrated in FIG. 9B(a), the controller 180 may display screen information 920*b*, 920*c* associated with a content different from the any content in the extended region 202 and main region 201 as illustrated in FIG. 9B(b). At this time, the controller 180 may maintain the playback 940*a* of the any content 910*c*.

In other words, referring to FIGS. 9A and 9B, screen information associated with a content different from any content may be displayed on the display unit 200 based on a predetermined type of touch 930 applied to either one of the main region 201 and extended region 202. Specifically, the controller 180 may display screen information associated with the different content in at least one of the main region 201 and extended region 202 based on a predetermined type of touch 930 applied to the main region 201. Furthermore, even though a predetermined type of touch 930 is applied to the extended region 202, the controller 180 may display screen information associated with the different content in at least one of the main region 201 and extended region 202.

At this time, the controller 180 may control the playback mode of a content in a different manner according to a region to which the predetermined type of touch 930 is applied. In other words, the controller 180 may play back a different content instead of the any content based on the predetermined type of touch 930 applied to the main region 201. Furthermore, when the predetermined type of touch 930 is applied to the extended region 202 different from the main region 201, the controller 180 may display screen information 920*b*, 920*c* associated with a content different from any content in the extended region 202 and main region 201 on the display unit 200 (when the any content is continuously played back) in a state that the playback of the any content is maintained.

On the other hand, when a predetermined type of touch 930 is applied to the extended region 202 in a state that any content is being played back, the controller 180 may suspend 940*b* the playback of the any content as illustrated in FIG. 9B(c). Furthermore, the controller 180 may screen information 920*a*, 920*b* associated with a content different from any content in the extended region 202 and main region 201 based on a predetermined type of touch applied to the extended region 202. At this time, the different content may not be played back, contrary to the description in FIG. 9A(b).

In other words, there may be a difference between FIGS. 9B(c) and 9A(b) in whether or not a different content is immediately played back based on a predetermined type of touch 930 being applied thereto. For example, as illustrated in FIG. 9A(b), when a predetermined type of touch 930 is applied to the main region 201, the controller 180 may play back a content different from any content based on the touch 930. For another example, as illustrated in FIG. 9B(c), when a predetermined type of touch 930 is applied to the extended region 202, the controller 180 may display screen information 920*b*, 920*a* associated with a different content instead of screen information associated with any content on the display unit 200 but may not display both the any content and the different content based on the touch 930.

FIGS. 9B(b) and 9B(c) may be selectively applied (implemented) based on the user's setting or implemented, respectively, based on a different type of touch applied thereto. For example, when a first type of touch is applied to the extended region 202, the controller 180 may display screen information associated with a different content on the display unit 200 in a state that the playback of any content is maintained as illustrated in FIG. 9B(b). Furthermore, when a second type of touch different from the first type is applied to the extended region 202, the controller 180 may display screen information associated with a different content on the display unit 200 but may not display both any content and the different content as illustrated in FIG. 9B(c).

On the other hand, though not shown in the drawing, the foregoing embodiments may be combined with one another in various ways based on the user's setting or request. For example, when a predetermined type of touch is applied to the main region 201 in a state that any content is being played back (or in a state that screen information 910*a*, 910*b* associated with the any content is displayed on the display unit 200), the controller 180 may display screen information associated with a content different from the any content on the display unit 200 in a state that the playback of the any content is maintained. Furthermore, when a predetermined type of touch is applied to the extended region 202, the controller 180 may play back a content different from any content, and display screen information associated with the different content on the display unit 200.

In addition, various embodiments for controlling any content in different ways based on a region to which a predetermined type of touch is applied among (or between) the main region 201 and extended region 202 on the display unit 200 should be construed to be included in the scope of the right of the present disclosure.

On the other hand, when a drag touch started from the extended region 202 and released from the main region 201 is applied, the controller 180 may play back a content corresponding to screen information displayed in the extended region 202.

For example, as illustrated in FIG. 9C(a), when a predetermined type of touch 930 (for example, drag touch) is applied to the extended region 202 in a state that screen information 910*a*, 910*b* associated with any content is displayed in the main region 201 and extended region 202 on the display unit 200 (in a state that any content is being played back), screen information 920*c*, 920*b* associated with a content different from the any content may be displayed on the display unit 200. At this time, as illustrated in FIG. 9C(b), the playback of the any content may be maintained based on the predetermined type of touch 930 applied to the extended region 202 other than the main region 201. When the playback of the any content is maintained, screen information 920*c* associated with a different content and screen information 910*c* associated with any content may be concurrently displayed in the main region 201 as illustrated in FIG. 9C(b).

Then, when a drag touch started from the extended region 202 and released from the main region 201 is applied in a state that screen information 920c, 920b associated with a content different from the any content is displayed in at least one of the main region 201 and extended region 202, the controller 180 may suspend the playback of the any content and play back the different content. In this case, only screen information 920c, 920d associated with the different content may be displayed in the main region 201 of the display unit 200.

On the other hand, an icon (or graphic object) 960 linked to a function of playing back a content corresponding to screen information displayed in the extended region 202 may be displayed in the extended region 202. When the icon 960 is selected, the controller 180 may display screen information 920d associated with a content (a different content in case of FIG. 9C(b)) corresponding to the screen information instead of screen information 910c associated with any content displayed in the main region 201 as illustrated in FIG. 9C(c). Furthermore, the controller 180 may play back a content (a different content in case of FIG. 9C(b)) corresponding to screen information displayed in the extended region 202 based on the selection of the icon 960.

However, the present disclosure may not be necessarily limited to the foregoing embodiment, and the controller 180 may play back a content corresponding to screen information displayed in the extended region 202 in various ways. For an example, a content corresponding to the screen information may be played back based on a predetermined type of touch (for example, a short touch, a long touch, etc.) applied to the extended region 202 or an icon (or graphic object) associated with playback displayed in the main region 201 being touched.

Through the foregoing configuration, it may be possible to provide a new user interface capable of controlling a content in an optimized method using a main region included in the display unit and an extended region formed to be extended in at least one side of the main region.

Furthermore, the present disclosure may display information associated with a content different from the content (for example, a content to be played back next or at least one content included in a current playlist on the display unit 200 in a state that the playback of a content currently being played back is maintained, thereby providing a UI/UX allowing a user to easily select his or her desired content.

Hereinafter, various embodiments for controlling a content using the main region 201 and extended region 202 of the display unit 200 will be described in more detail with reference to the accompanying drawings.

Figure 10A:
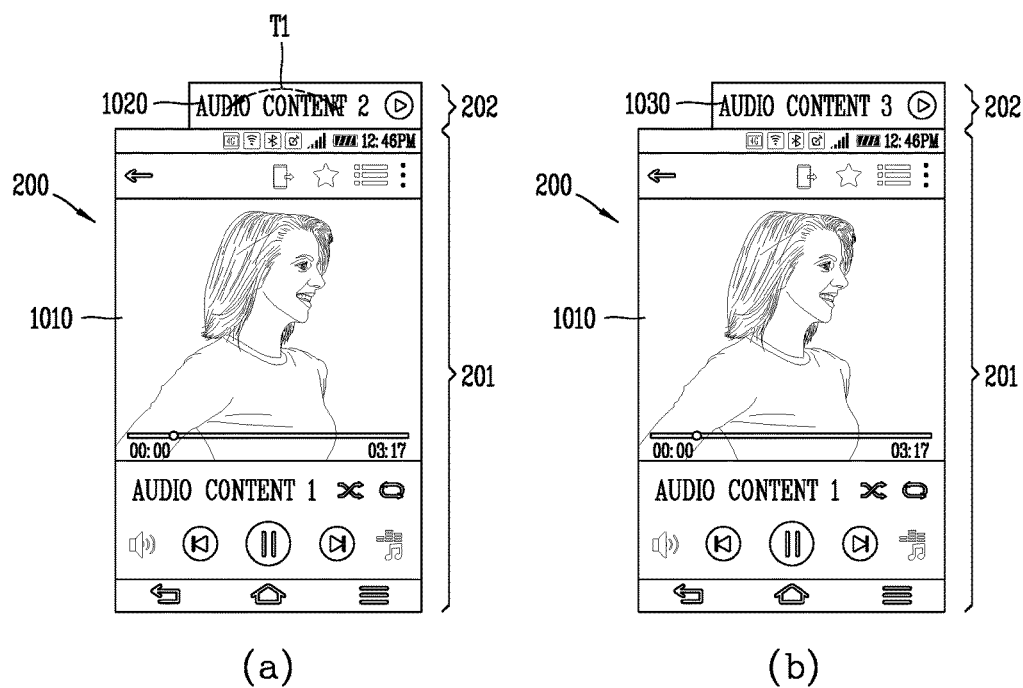
FIGS. 10A, 10B and 10C are conceptual views for explaining a method of controlling a content in different modes based on a touch applied to an extended region according to an embodiment of the present disclosure.
Figure 10B:
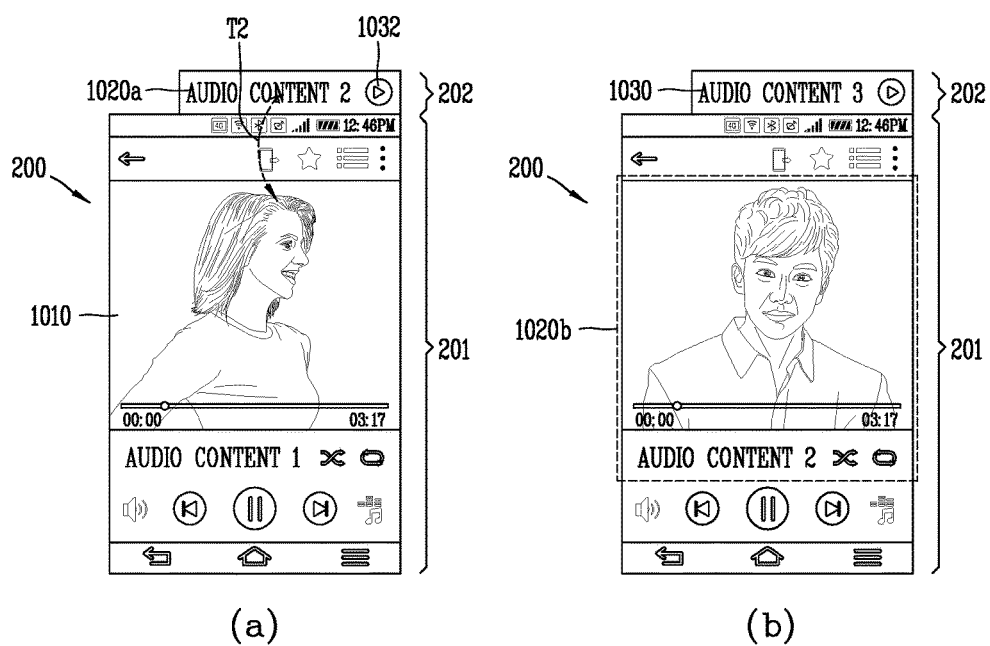
Figure 10C:
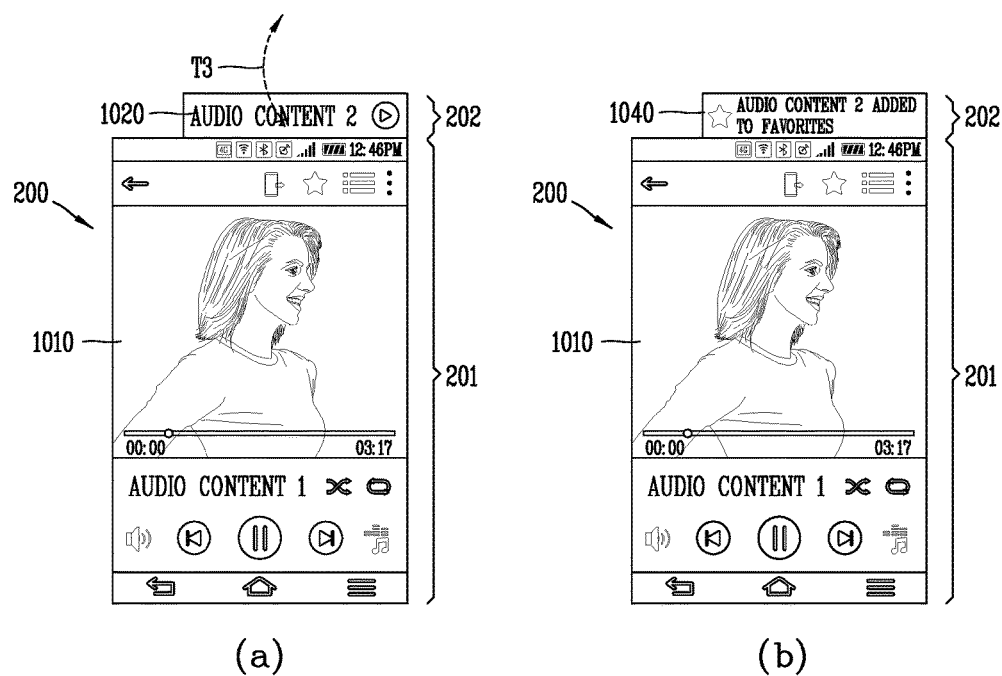

FIGS. 10A, 10B and 10C are conceptual views for explaining a method of controlling a content in different modes based on a touch applied to an extended region according to an embodiment of the present disclosure.

The display unit 200 according to the present disclosure may display screen information associated with a first content and screen information associated with a second content different from the first content. For example, as illustrated in FIG. 10A(a), screen information 1010 associated with a first content may be displayed in the main region 201 of the display unit 200, and screen information 1020 associated with a second content different from the first content may be displayed in the extended region 202 of the display unit 200. However, the present disclosure may not be necessarily limited to this, and the first and the second content may be the same content.

The controller 180 may control the display unit 200 in a different mode based on a position from which a predetermined type of touch (for example, drag touch) started from the extended region 202 is released. Here, controlling the display unit 200 in a different mode may be taken as the meaning of controlling any content (for example, a first and a second content) in a different mode or performing a different function. Hereinafter, an example in which the predetermined type of touch is a drag touch will be described.

For example, the controller 180 may perform a different function based on whether or not a drag touch started from the extended region 202 is released within the extended region 202.

For an example, when a drag touch (T1) started from one position of the extended region 202 is released within the extended region 202 as illustrated in FIG. 10A(a), the controller 180 may display screen information 1030 associated with a third content different from the second content instead of screen information 1020 associated with the second content displayed in the extended region 202 as illustrated in FIG. 10A(b). Here, the controller 180 may maintain the display of the screen information 1010 associated with a first content in the main region 201.

Specifically, when a drag touch (T1) started from the extended region 202 is released within the extended region 202, the controller 180 may control the display unit 200 to display screen information 1030 associated with a third content different from the second content instead of screen information 1020 associated with the second content displayed in the extended region 202 in a state that the display of the screen information moving groove 1010 associated with the first content is maintained in the main region 201. Here, when the first content is being played back, the controller 180 may maintain or stop (or pause) the playback of the first content.

Furthermore, though not shown in the drawing, when a drag touch (T1) started from the extended region 202 is released within the extended region in a state that screen information associated with a first content is displayed in the extended region 202 (or in a state that a first content is being played back), the controller 180 may display screen information associated with a second content different from the first content on at least part of the main region 201. Furthermore, the controller 180 may display screen information associated with a third content different from the second content in the extended region 202 based on the drag touch (T1). Here, when the first content is being played back, the controller 180 may maintain or suspend (or pause) the playback of the first content based on the drag touch (T1) being applied thereto.

On the other hand, when a drag touch started from the extended region 202 is released from a position out of the extended region 202, the controller 180 may perform a different function based on a direction in which the drag touch is applied.

Here, releasing a drag touch started from the extended region 202 from a position out of the extended region 202 may include the meaning of applying the drag touch to an edge of the extended region 202.

Specifically, a touch panel (or touch sensor) of the present disclosure may be formed to correspond to the display unit 200 or formed to be larger than the size of the display unit 200 while including the display unit 200.

Here, when the touch panel is formed to be larger than the size of the display unit 200, the controller 180 may determine a position itself from which a drag touch is released within a region other than the extended region 202 (i.e., a region out of the extended region 202).

Furthermore, in case where the touch panel is formed to correspond to the display unit 200, when a drag touch started within the extended region 202 is extended up to one edge of the extended region 202 (or a drag touch is sensed up to the one edge and then the drag touch is no longer sensed), the controller 180 may determine that the drag touch has been released from a position out of the extended region 202.

Furthermore, the controller 180 may sense a direction itself to which the drag touch is applied or determine a direction in which the drag touch is applied (or whether or not the drag touch is moved out of which direction of the extended region 202), and the like based on one edge of the extended region 202 at which the drag touch is sensed.

In other words, when a drag touch started from the extended region 202 is released from a position out of the extended region 202, the controller 180 may perform a function different from the foregoing function illustrated in FIG. 10A. Here, the controller 180 may perform a different function based on a direction in which the drag touch is applied.

For example, when the drag touch is applied in a first direction and then released from a position out of the extended region, the controller 180 may display screen information associated with the second content in the main region. Furthermore, when the drag touch is applied in a second direction different from the first direction and then released from a position out of the extended region, the controller 180 add the second content to a second playlist different from a first playlist which is a current playback object.

For example, as illustrated in FIG. 10B(a), in a state that screen information 1010 associated with a first content is displayed in the main region 201, and screen information 1020a associated with a second content is displayed in the extended region 202, a drag touch (T2) started from the extended region 202 may be applied in a first direction (for example, downward direction) and then released from a position out of the extended region (for example, one position of the extended region 202). In other words, the drag touch (T2) may be released within the main region 201 out of the extended region 202.

In this case, the controller 180 may display screen information 1020b associated with a second content corresponding to screen information 1020a displayed in the extended region 202 in the main region 201 of the display unit 200 based on the drag touch (T2). At this time, screen information 1030 associated with a third content different from the second content may be displayed in the extended region 202. Furthermore, the controller 180 may play back a second content based on the drag touch (T2).

For another example, as illustrated in FIG. 10C(a), when a drag touch started from the extended region 202 is applied in a second direction (for example, upward direction) different from the first direction and then released from a position out of the extended region, the controller 180 may add (set, register, reflect) a content (for example, second content) corresponding to screen information displayed in the extended region 202 to a second playlist different from a first playlist which is a current playback object.

Here, playlist as a list of songs may be understood to have the concept in which at least one content which is a playback (display) object in a mobile terminal is collected. The controller 180 may play back at least one content included in a playlist in a sequential or shuffled order.

For example, as illustrated in FIG. 10C(a), a first content (audio content 1) and a second content (audio content 2) may be included in a first playlist which is a current playback object (currently applied, currently reflected, currently being played back). Specifically, the controller 180 may play back any one of a plurality of contents (for example, first content) included in the first playlist which is a current playback object.

In this case, screen information associated with the any one content may be displayed in the main region 201. Furthermore, screen information 1020 corresponding to a content (for example, second content) to be played back next to the any one of a plurality of contents included in the first playlist may be displayed in the extended region 202.

In this state, when a drag touch (T3) started from the extended region 202 is applied in a second direction different from the first direction and then moved out of the extended region (or the drag touch (T3) is extended up to one edge located at the side of the second direction among a plurality of edges of the extended region 202), the controller 180 may add a content (for example, second content) corresponding to the screen information 1020 to a second playlist different from the first playlist. Here, the second playlist may be an additional playlist or favorites list set (generated, added) to a user, for an example.

Here, adding a content to a playlist may be taken as the meaning of grouping the content into a specific group. In other words, a group which will be described below may have the same/similar concept to a playlist.

The controller 180 may display notification information 1040 indicating that the second content has been added to the second playlist on the display unit 200 (or in the extended region 202) in response to the drag touch (T3) as illustrated in FIG. 10C(b). The notification information 1040 may disappear after the passage of a predetermined period of time.

On the other hand, the controller 180 may add a content (for example, second content) corresponding to screen information displayed in the extended region 202 to a different playlist based on a direction in which a drag touch started from the extended region 202 is applied. For example, when a drag touch started from the extended region 202 is applied in a second direction (for example, upward direction) and then released from a position out of the extended region 202, the controller 180 may add the second content to a second playlist. For another example, when a drag touch started from the extended region 202 is applied in a third direction (for example, left direction) different from the second direction and then released from a position out of the extended region 202, the controller 180 may add the second content to a third playlist different from the second playlist.

Hereinafter, a method of adding a content to a playlist different from a playlist which is a current playback object and a method of playing pack a content included in the different playlist will be described in more detail with reference to the accompanying drawings.

FIGS. 11A, 11B, 11C, 12A, 12B and 12C are conceptual views for explaining a method of grouping a plurality of contents corresponding to music.

According to the present disclosure, the controller 180 may add a content (a content corresponding to screen information displayed in the main region 201) to a second playlist different from a first playlist corresponding to a current playback object.

Specifically, the controller 180 may add a first content to a second playlist different from a first playlist which is a current playback object in a state that screen information 1110 associated with the first content is displayed in the main region 201 of the display unit 200.

Figure 11A:
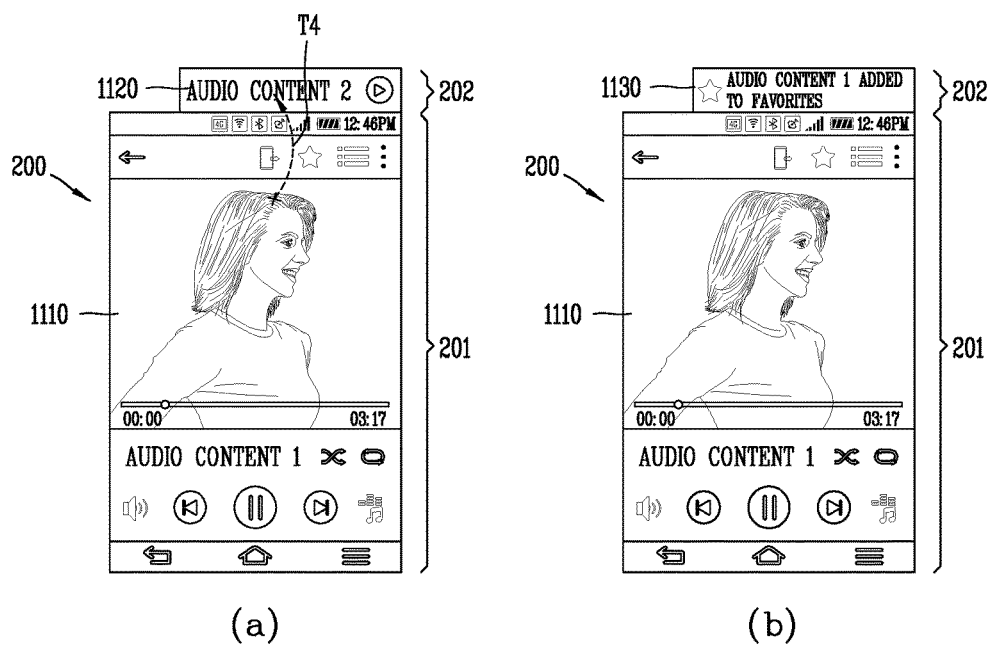
FIGS. 11A, 11B, 11C, 12A, 12B and 12C are conceptual views for explaining a method of grouping a plurality of contents corresponding to music.

For example, as illustrated in FIG. 11A(a), the controller 180 may add the first content to the second playlist based on a drag touch (T4) started from the main region 201 displayed with screen information associated with a first content and released from the extended region 202 is applied (or a drag touch started from the main region 201 is applied in one direction (for example, upward direction) and then released from a position out of the main region 201).

The controller 180 may display notification information 1130 indicating that the first content has been added to the second playlist on the display unit 200 (or in the extended region 202) in response to the drag touch (T4) as illustrated in FIG. 11A(b). The notification information 1130 may disappear after the passage of a predetermined period of time.

Then, according to the present disclosure, a content included in the second playlist may be played back through various methods or the second playlist may be displayed on the display unit 200.

The controller 180 may display screen information corresponding to the second playlist on the display unit 200 based on a predetermined type of touch applied to the display unit 200.

Figure 11B:
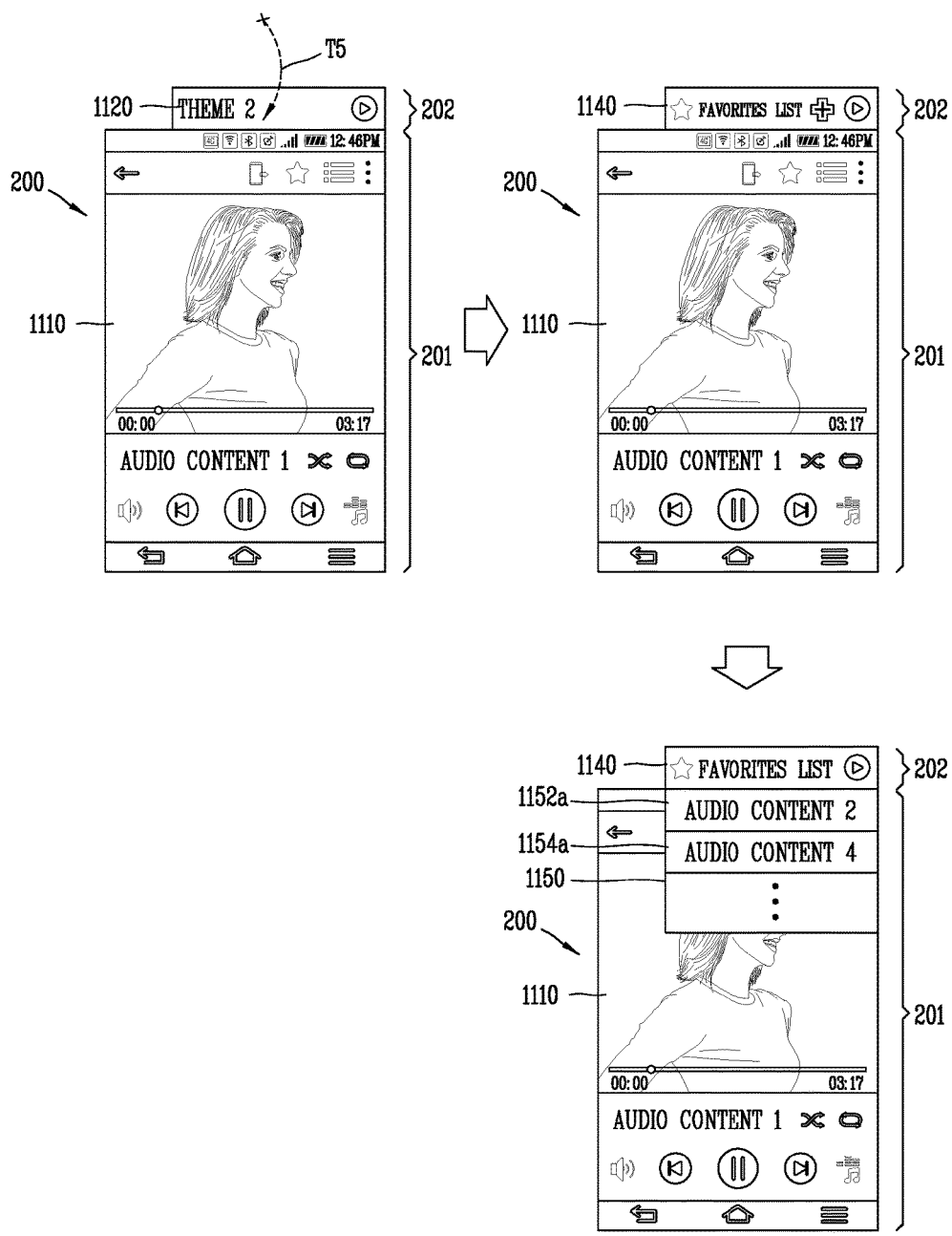
Figure 11C:
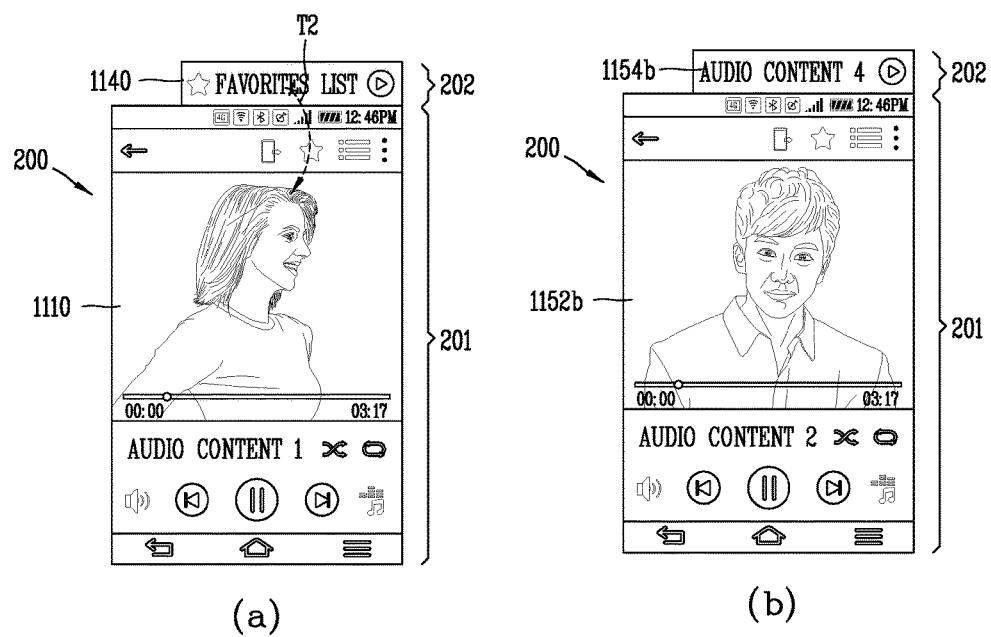

For example, when a drag touch (T5) started from a position out of the extended region 202 (or a drag touch started from one edge of the extended region) is released within the extended region 202 as illustrated in FIG. 11B(a), the controller 180 may display screen information 1140 corresponding to a playlist different from a playlist which is a current playback object as illustrated in FIG. 11B(b) on the display unit 200 (for example extended region 202). Here, screen information corresponding to the different playlist may be a name (or title) set to the different playlist, for an example.

The controller 180 may display screen information corresponding to a different playlist based on a direction in which a drag touch started from a position out of the extended region is applied.

For example, when a drag touch started within the extended region is applied in a second direction (for example, upward direction) is applied and then released from a position out of the extended region 202 as described above, it is assumed that a content (for example, second content) corresponding to screen information displayed in the extended region is added to a second playlist. Furthermore, when a drag touch started within the extended region 202 is applied in a third direction (for example, left direction) different from the second direction and then released from a position out of the extended region 202, it is assumed that a content (for example, second content) corresponding to screen information displayed in the extended region is added to a third playlist different from the second playlist.

In this case, as illustrated in FIG. 11B(b), when a drag touch (T5) started from a position out of the extended region 202 is applied in a direction (downward direction) opposite to the second direction (upward direction) and then released within the extended region 202 (or a drag touch started from one edge (for example, upper edge) of the extended region 202 is released within the extended region 202), the controller 180 may display screen information corresponding to the second playlist on the display unit 200 (for example, extended region 202).

Furthermore, though not shown in the drawing, when a drag touch started from a position out of the extended region 202 is applied in a direction (right direction) opposite to the third direction (left direction) and then released within the extended region 202 (or a drag touch started from another edge (for example, left edge) of the extended region 202 is released within the extended region 202), the controller 180 may display screen information corresponding to the third playlist on the display unit 200 (for example, extended region 202).

Then, when a predetermined type of touch is applied to screen information corresponding to a playlist displayed on the display unit 200, the controller 180 may display information (for example, content name) associated with a content included in the playlist on the display unit 200.

For example, when a touch is applied to screen information (1140) in a state that the screen information 1140 corresponding to a second playlist is displayed in the extended region 202 as illustrated in FIG. 11B(b) as illustrated in FIG. 11B(b), the controller 180 may display the second playlist 1150 (or information 1152a, 1154a associated with a content included in the second playlist) on at least part of the main region 201 as illustrated in FIG. 11B(c).

Hereinafter, a case where audio content 2 1152a and audio content 4 1154a are included in the second playlist will be described as an example.

On the other hand, when a drag touch started from the extended region 202 is released from the main region 201 in a state that screen information corresponding to the second playlist is displayed in the extended region 202, the controller 180 may change the second playlist instead of a first playlist which is a current playback object to the current playback object.

For example, screen information associated with any one content included in a first playlist may be displayed in the main region 201. Screen information 1140 corresponding to a second playlist different from the first playlist may be displayed in the extended region 202 based on the drag touch (T5) illustrated in FIG. 11B(a).

In this state, when the drag touch (T2) started from the extended region 202 is released from the main region 201, the controller 180 may apply (reflect) the second playlist to a playback object list. In this case, the controller 180 may play back any one content included in the second playlist.

When it is assumed that audio content 2 1152a and audio content 4 1154a are included in the second playlist as described above, the controller 180 may play back any one content (for example, audio content 2) among a plurality of contents included in the second playlist, and display screen information 1152b corresponding to the any one content in the main region 201 based on the drag touch (T2). Furthermore, the controller 180 may display screen information 1154b corresponding to a content (for example, audio content 4) to be played back next to the any one content among the plurality of contents included in the second playlist in the extended region 202.

In addition, as illustrated in FIG. 11B(c), when information 1152a or 1154a associated with any one content included in the playlist 1150 is selected in a state that the second playlist 1150 (or information (1152a, 1154a) associated with a content included in the second playlist) is displayed on at least part of the main region 201, the controller 180 may apply the second playlist to a playback object list. Furthermore, the controller 180 may play back the selected any one content, and display screen information associated with the any one content on the display unit 200 (for example, main region 201).

Through the foregoing configuration, the present disclosure may provide a user interface capable of allowing a user to easily add a plurality of contents to his or her desired playlist using the main region and extended region, and more easily changing a user's desired playlist.

On the other hand, according to the present disclosure, it may be possible to provide a user interface capable of generating and managing a playlist with an enhanced security.

Specifically, the controller 180 may store a content corresponding to screen information displayed in the extended region 202 in a playlist requiring user authentication based on a drag touch started from the extended region 202 applied in one direction and then released from a position out of the extended region 202.

For example, said one direction may be a direction set to store the content in a playlist requiring the user authentication, for an example, a third direction (for example, left direction) different from the first and the second direction as described above.

Figure 12A:
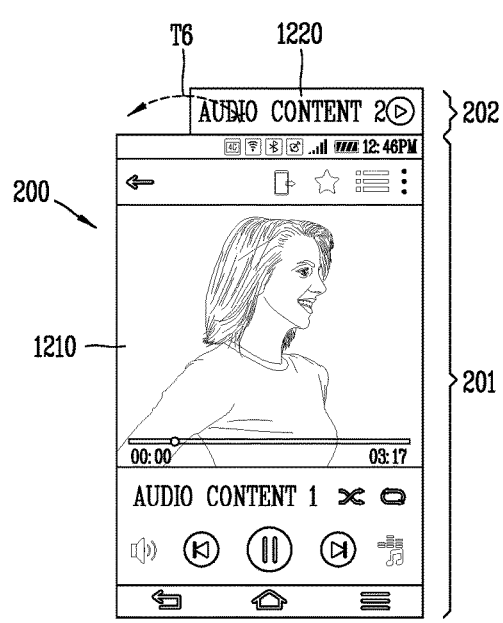
Figure 12A:
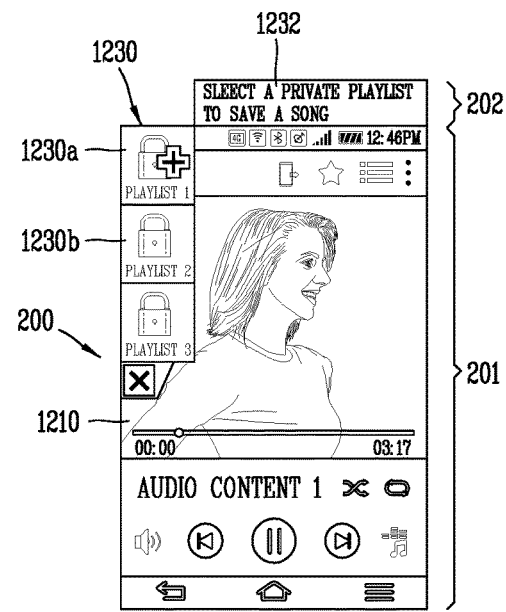
Figure 12A:
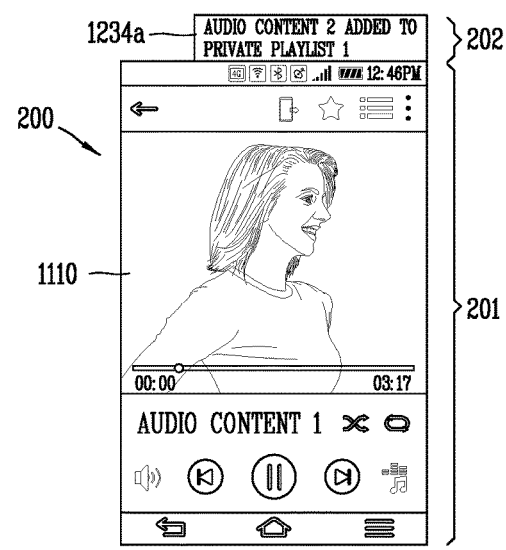

Describing more specifically, as illustrated in FIG. 12A (a), the controller 180 may add (store) a second content to a playlist requiring user authentication based on a drag touch (T6) started from the extended region 202 being applied in the one direction and then released from a position out of the extended region 202 in a state that screen information 1220 associated with the second content is displayed in the extended region 202.

At this time, when at least two playlists requiring the user authentication are previously set (generated), as illustrated in FIG. 12A(b), the controller 180 may display icons 1230*a*, 1230*b* corresponding to the at least two playlists on at least part of the main region 201 based on the drag touch (T6). At this time, notification information 1232 for guiding a user to select any one of the displayed icons may be displayed in the extended region 202.

Then, as illustrated in FIG. 12A(b), when any one icon (for example, 1230*a*) is selected (or touched) among icons 1230*a*, 1230*b* corresponding to the at least two playlists, the controller 180 may add the second content to a playlist corresponding to the any one icon. Furthermore, the controller 180 may display notification information 1240*a* indicating that the second content has been added to a playlist corresponding to the any one icon in the extended region 202 based on the any one icon being selected.

Furthermore, the controller 180 may add a content corresponding to screen information displayed in the main region 201 to a playlist requiring user authentication based on a drag touch started from the main region 201.

Figure 12B:
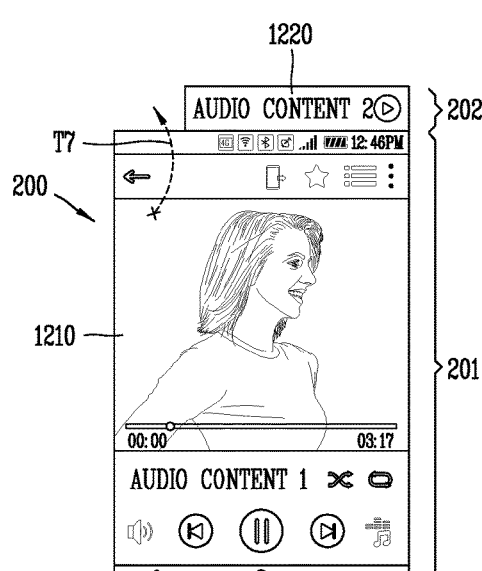
Figure 12B:
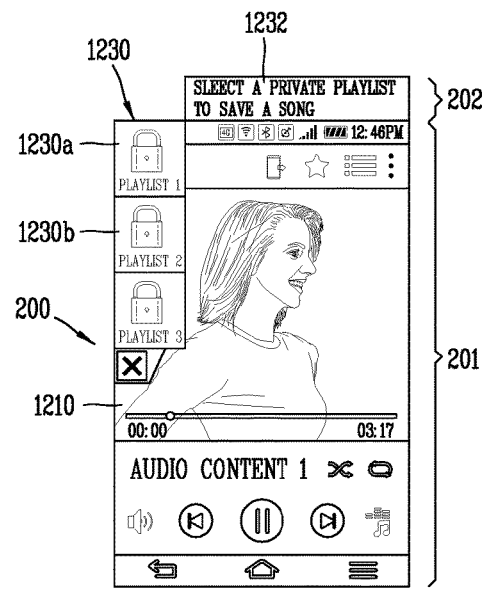
Figure 12B:
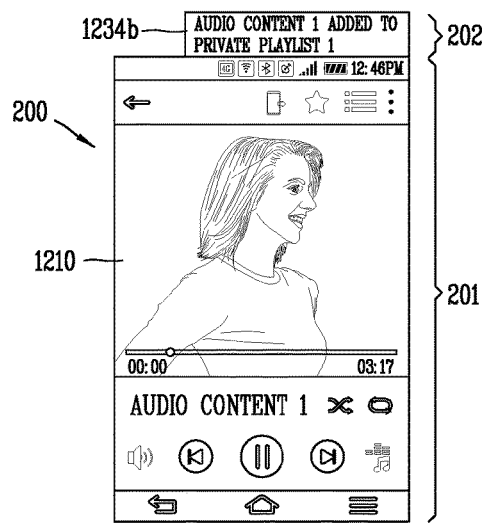

For example, as illustrated in FIG. 12B(a), when a drag touch (T7) started from the main region 201 is released from a position out of the main region 201 and extended region 202 in a state that screen information 1210 associated with a first content is displayed in the main region 201, the controller 180 may add the first content to a playlist requiring user authentication.

Similarly, when at least two playlists requiring the user authentication are previously set (generated), as illustrated in FIG. 12B(b), the controller 180 may display icons 1230*a*, 1230*b* corresponding to the at least two playlists on at least part of the main region 201 based on the drag touch (T7). At this time, notification information 1232 for guiding a user to select any one of the displayed icons may be displayed in the extended region 202.

Then, as illustrated in FIG. 12B(b), when any one icon (for example, 1230*a*) is selected (or touched) among icons 1230*a*, 1230*b* corresponding to the at least two playlists, the controller 180 may add the first content to a playlist corresponding to the any one icon. Furthermore, the controller 180 may display notification information 1240*b* indicating that the first content has been added to a playlist corresponding to the any one icon in the extended region 202 based on the any one icon being selected.

Figure 12C:
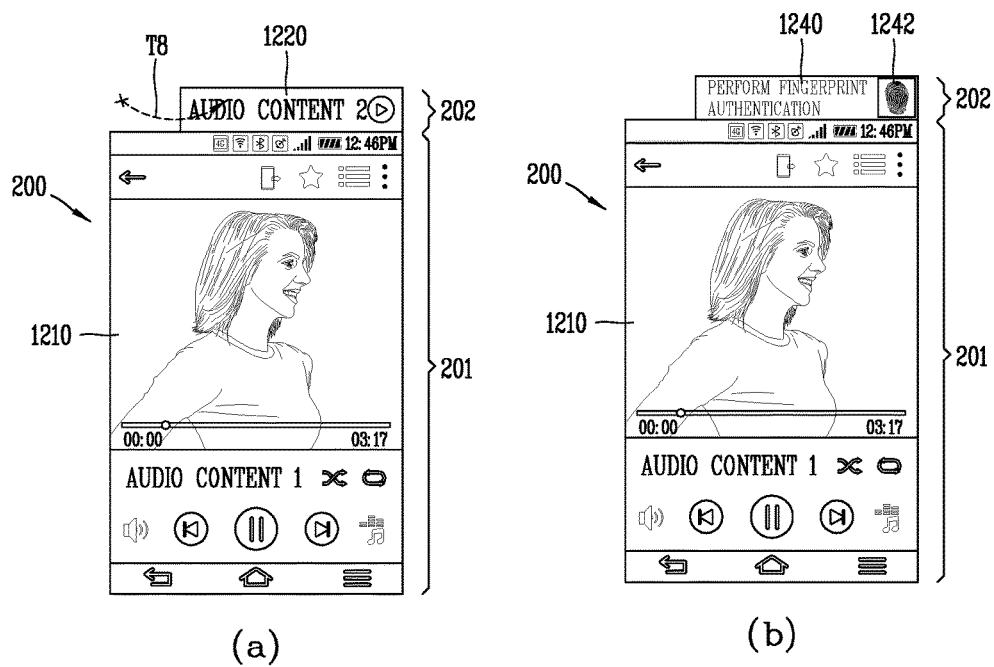
Figure 12C:
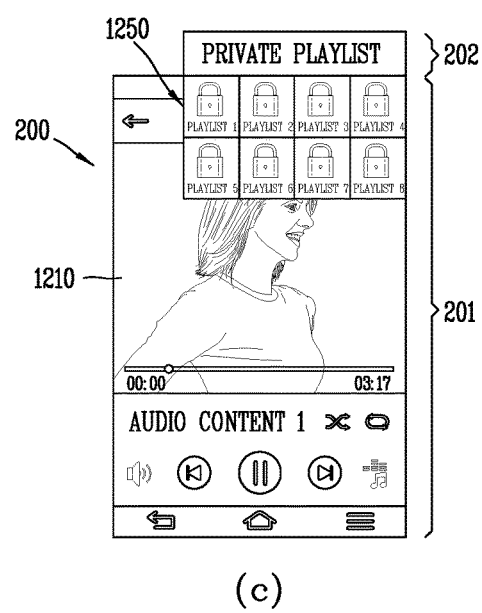

Then, as illustrated in FIG. 12C(a), the controller 180 may sense a drag touch (T8) started from a position out of the main region 201 and extended region 202 being applied in a direction opposite to the foregoing direction illustrated in FIG. 12A(a) and then released from the extended region 202. For example, when said one direction, namely, a direction in which a drag touch for adding a content to a playlist requiring user authentication, is a left direction, the opposite direction may be a right direction.

In this case, as illustrated in FIG. 12C(b), the controller 180 may display notification information 1240 for guiding user authentication in the extended region 202.

Though not shown in the drawing, when the drag touch (T8) is released from the main region 201, the notification information 1240 may be displayed in at least one of the main region 201 and extended region 202.

Returning to the subject again, the user authentication may include various types of authentications using biometric information such as fingerprint authentication, iris authentication, voice authentication, and the like, for an example. The types of user authentication and algorithm/methods for performing the same will depart from the gist of the present disclosure, and thus the detailed description thereof will be omitted.

A mobile terminal according to the present disclosure may include a fingerprint recognition sensor, and the fingerprint recognition sensor may be integrated into the display unit 200 or user input unit 123. For example, the fingerprint recognition sensor may be integrated therein to overlap with at least part of the display unit 200.

In case that the foregoing user authentication is fingerprint authentication, an indicator 1242 for guiding a place allowing a user's fingerprint to be brought into contact with may be displayed on the display unit 200. For example, when the drag touch (T8) is applied, notification information 1240 for guiding user authentication (fingerprint authentication) and the indicator 1242 on the display unit 200 (for example, extended region 202). The indicator 1242 may be displayed to correspond to a location at which the fingerprint recognition sensor is integrated.

When the user authentication is successful, the controller 180 may display screen information corresponding to a playlist requiring user authentication on the display unit 200 (for example, extended region 202).

When a drag touch started from the extended region 202 is released from the main region 201 in a state that screen information corresponding to a playlist requiring user authentication is displayed in the extended region 202, the controller 180 may change the playlist to a current playback object list. Furthermore, the controller 180 may play back any one of contents included in the playlist, and display screen information corresponding to the any one on the display unit 200 (for example, main region 201).

When there are a plurality of playlists requiring user authentication, the controller 180 may display a plurality of icons 1250 corresponding to the plurality of playlists on the display unit 200 (for example, main region 201) as illustrated in FIG. 12C(c).

When any one of the plurality of icons 1250 corresponding to the plurality of playlists is selected, the controller 180 may change a playlist corresponding to the any one to a current playback object list. Furthermore, the controller 180 may play back a content included in a playlist corresponding to the any one, and display screen information corresponding to the played-back content on the display unit 200 (for example, main region 201).

Through the foregoing configuration, the present disclosure may provide a new user interface capable of generating a playlist on which only a user of the mobile terminal can access, and playing back a content included in the playlist through user authentication.

The foregoing description may be may be also analogically applied to a state that screen information associated with a specific content is displayed in the main region and extended region (for example, a state illustrated in FIG. 9A(a)) in the same or similar manner in addition to a state that screen information associated with a first content is displayed in the main region and screen information associated with a second content different from the first content is displayed in the extended region.

A case where a content is music (music data) has been described as an example in the above, but the foregoing description may be also analogically applied to a case where the content is a video (video data) in the same or similar manner.

Hereinafter, a method of controlling a video using the main region and extended region of the display unit will be described in more detail with reference to the accompanying drawings.

Figure 13A:
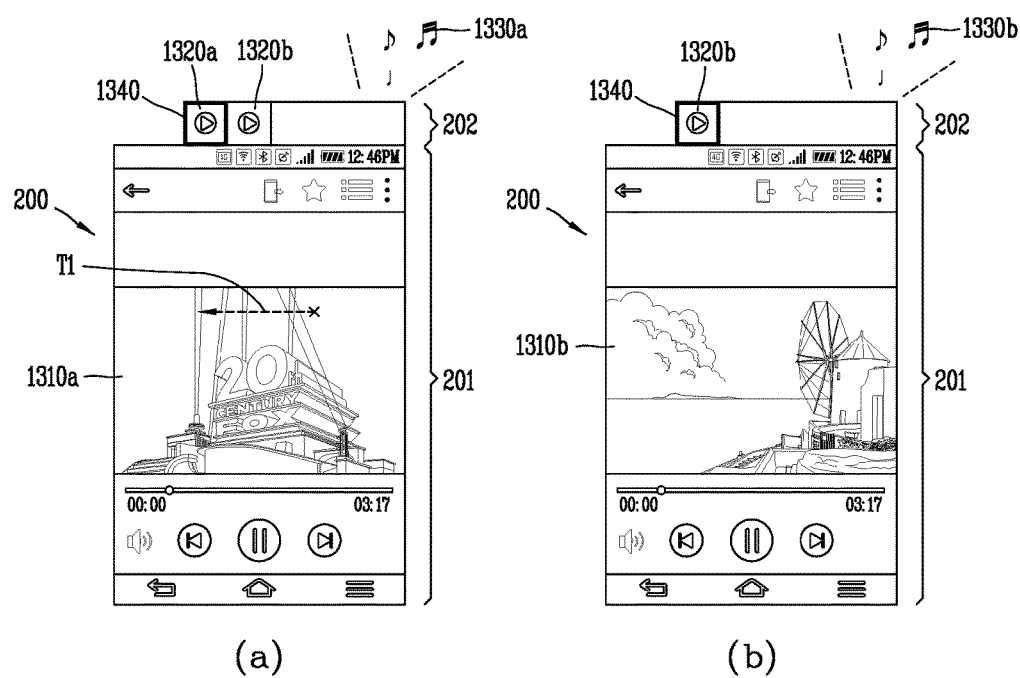
FIGS. 13A, 13B, 13C are conceptual views for explaining a method of controlling contents corresponding to videos using a main region and an extended region.
Figure 13B:
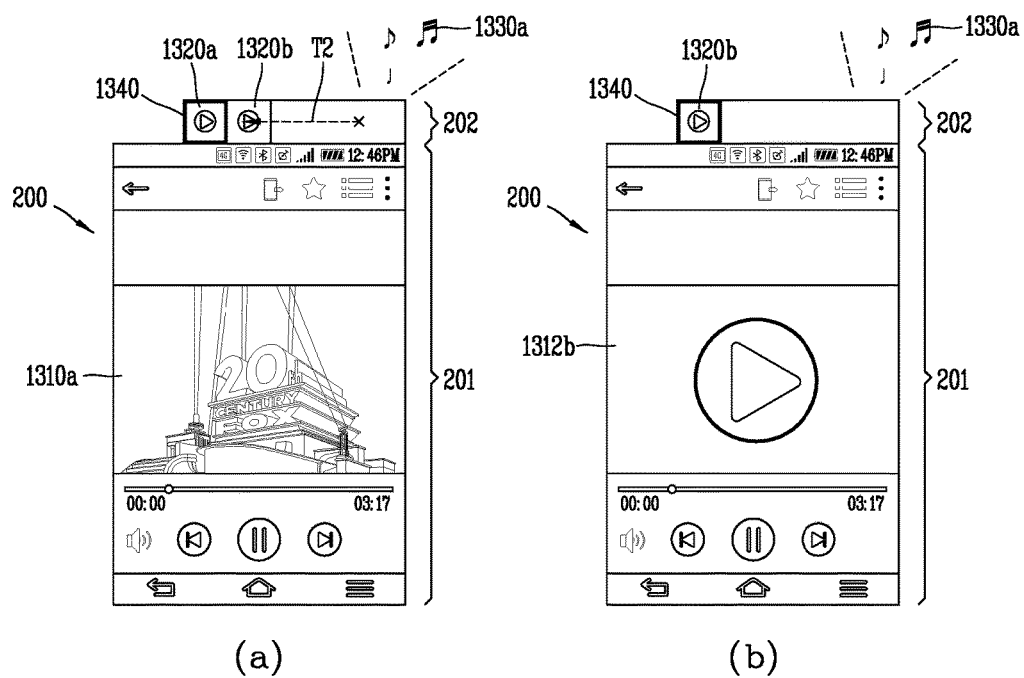
Figure 13C:
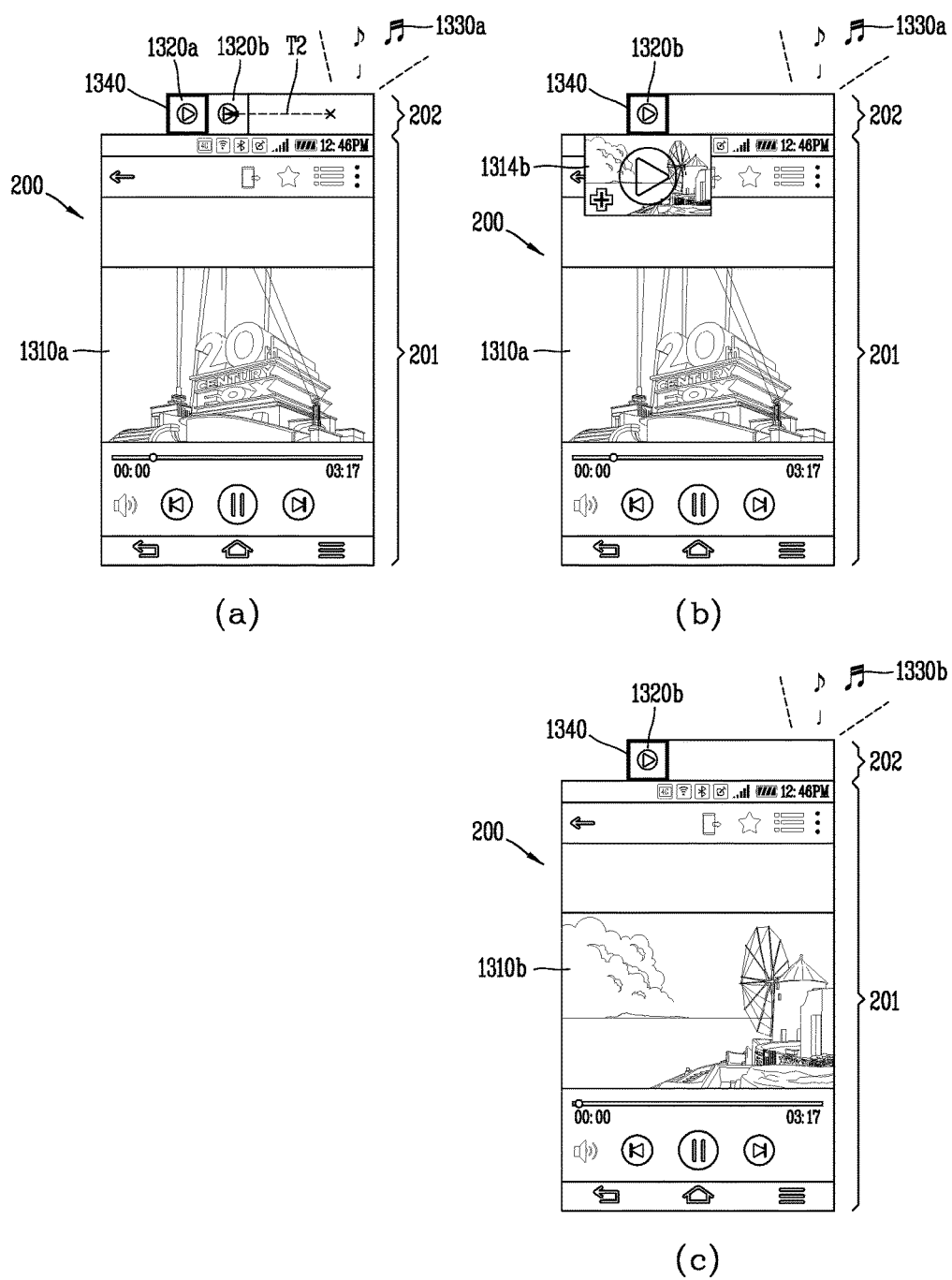

FIGS. 13A, 13B, 13C are conceptual views for explaining a method of controlling contents corresponding to videos using a main region and an extended region.

A first video 1310*a* may be played back (displayed) in the main region 201 of the display unit 200 according to the present disclosure as illustrated in FIG. 13A(a). At this time, the first video 1310*a* may be in a state of being played back according to the flow of time in the main region 201, and any one still picture (image) of a plurality of still pictures constituting the first video may be displayed in a state that the first video is stopped (or paused). The first video 1310*a* may be a video stored in the memory 170 or video received from an external server/the Internet.

Furthermore, at least one thumbnail 1320*a*, 1320*b* corresponding to at least one video may be displayed in the extended region 202 of the display unit 200 according to the present disclosure. A thumbnail corresponding to the video may be an image in which any one still image (or representative still image) of a plurality of still images included in each video is formed in a predetermined size.

Furthermore, an indicator 1340 for guiding a video (or image) currently displayed in the main region 201 may be displayed in the extended region 202 as illustrated in FIG. 13A(a). The display type of the indicator 1340 may vary according to whether or not a video displayed in the main region 201 is being played back.

On the other hand, the present disclosure may control a video in a different mode based on a region to which a predetermined type of touch is applied among the main region 201 and extended region 202 on the display unit 200.

For example, when the predetermined type of touch (for example, drag touch) (T1) is applied to the main region 201 in a state that the first video 1310*a* is displayed in the main region 201 (or the first video 1310*a* is in a paused state) as illustrated in FIG. 13A(a), the controller 180 may play back a second video 1310*b* different from the first video as illustrated in FIG. 13A(b).

The second video 1310*b* may be a video stored in the memory 170 or video received from an external server/the Internet. Furthermore, the second video 1310*b* may be a video to be played back next to the first video.

The audio output unit may output the sound of the second video 1310*b* instead of the sound of the first video 1310*a* based on the predetermined type of touch (T1) applied thereto. Furthermore, the second video 1310*b* instead of the first video 1310*a* may be played back (displayed) according to the flow of time based on the predetermined type of touch (T1) in the main region 201. Furthermore, the at least one thumbnail may be moved (or scrolled) based on the predetermined type of touch (T2) in the extended region 202.

As illustrated in FIG. 13A(b), when the second video 1310*b* instead of the first video is played back based on the predetermined type of touch (T1) is applied to the main region 201, the indicator 1340 included in the extended region 202 and the thumbnail 1320*b* corresponding to the second video may be displayed in an overlapping manner with each other.

For another example, when the predetermined type of touch (for example, drag touch) (T2) is applied to the extended region 202 in a state that the first video 1310*a* is displayed in the main region 201 (or the first video 1310*a* is in a paused state) as illustrated in FIG. 13B(a), the controller 180 may display an image 1312*b* (for example, any one still image of a plurality of still images constituting the second video) corresponding to a second video different from the first video in the main region 201 as illustrated in FIG. 13B(b). At this time, the first video may be in a state of being played back, and the second video may be in a state of not being played back. In other words, the controller 180 may display only the image 1312*b* corresponding to the second video on at least part of the main region 201 in a state that the output of the sound 1330*a* of the first video is maintained.

Similarly, as illustrated in FIG. 13B(b), when the predetermined type of touch (T2) is applied to the extended region 202, the indicator 1340 included in the extended region 202 and the thumbnail 1320*b* corresponding to the second video may be displayed in an overlapping manner with each other.

In other words, when a predetermined type of touch is applied to the main region 201, the controller 180 may immediately play back a second video instead of a first video. Furthermore, when a predetermined type of touch is applied to the extended region 202, the controller 180 may display only an image corresponding to a second video in the main region 201 in a state that the playback of a first video is maintained (i.e., in a state that the output of the sound of the first video is maintained).

On the other hand, as illustrated in FIG. 9B in the above, when the predetermined type of touch (T2) is applied to the extended region 202, the controller 180 may stop (pause) the playback of the first video 1310*a*, and may not play back the second video 1310*b*.

For another example, when the predetermined type of touch (T2) is applied to the extended region 202 in a state that the first video 1310*a* is displayed in the main region 201 (or the first video 1310*a* is in a paused state), a plurality of thumbnails included in the extended region 202 may be moved (scrolled).

Then, as illustrated in FIG. 13C(b), the controller 180 may display an enlarged image 1314*b* of a thumbnail 1320*b* overlapping with the indicator 1340 among the plurality of thumbnails on part of the main region 201.

At this time, even when the predetermined type of touch (T2) is applied to the extended region 202, the playback (or display) of the first video 1310*a* may be maintained. In other words, the first video 1310*a* and the enlarged image 1314*b* may be concurrently displayed in the main region 201.

Then, when a touch is applied to the enlarged image 1314b, the controller 180 may display (play back) the video 1310b corresponding to the enlarged image 1314b as illustrated in FIG. 13C(c). For example, when the enlarged image 1314b is an enlarged image of the thumbnail 1320b corresponding to the second video 1310b different from the first video, the controller 180 may play back the second video 1310b instead of the first video 1310a currently being played back based on the enlarged image 1314b being touched. In this case, the audio output unit may output the sound 1330b of the second video.

On the other hand, though not shown in the drawing, when a drag touch started from any one thumbnail among a plurality of thumbnails included in the extended region 202 is released from the main region 201, the controller 180 may display a video corresponding to the any one thumbnail through the main region 201 of the display unit 200 and audio output unit. In this case, the any one thumbnail and the indicator 1340 may be displayed in an overlapping manner with each other.

Through the foregoing configuration, even when the content is a video, it may be possible to provide a user interface capable of immediately playing back a next video instead of the video currently being played back or more conveniently checking the information of a video to be played back next in a state that the playback of the video is maintained based on a touch applied to the main region or extended region.

On the other hand, according to the present disclosure, it may be possible to group a plurality of contents into one group using the main region and extended region on the display unit. Hereinafter, a method of grouping a plurality of contents into one group will be described in more detail with reference to the accompanying drawings.

FIGS. 14A, 14B, 14C, 14D and 14E are conceptual views for explaining a method of executing a method of grouping a plurality of contents corresponding to images.

A group which will be described below may denote a software folder. In other words, grouping a plurality of contents into one group may be taken as a meaning of collecting a plurality of contents into any one folder.

Furthermore, hereinafter, a case where the content is at least one of an image (image data) and a video (video data) will be described as an example.

At least one content (image) 1400 may be displayed in the main region 201 of the display unit 200. The at least one content (image) 1400 may include a representative still image (or thumbnail) of video as well as a still image.

Figure 14A:
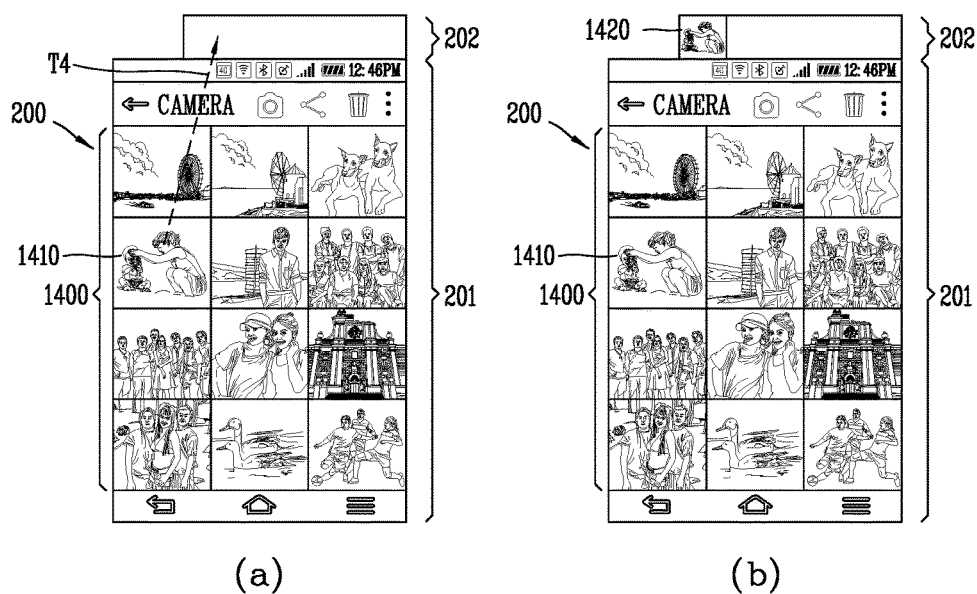
FIGS. 14A, 14B, 14C, 14D and 14E are conceptual views for explaining a method of executing a method of grouping a plurality of contents corresponding to images.

Then, as illustrated in FIG. 14A(a), when a drag touch (T4) started from any one content 1410 of the at least one content 1400 is released from the extended region 202, the controller 180 may display a thumbnail 1420 corresponding to the any one content 1410 in the extended region 202. In other words, a thumbnail 1420 corresponding to the any one content 1410 may be displayed in the extended region 202 based on a drag touch started from the any one content 1410 of the at least one content 1400 displayed in the main region 201 being released from the extended region 202.

The thumbnail 1420 may have substantially the same screen information as that of the any one content 1410. Furthermore, the thumbnail 1420 may be also understood as an image in which the any one content 1410 is reduced to a predetermined size.

On the other hand, the any one content 1410 may be continuously displayed in the main region 201 or disappear from the extended region 202 based on the drag touch (T4) being applied thereto. It may be selectively carried out according to a user's setting or respectively carried out based on the type of a touch applied to the any one content.

Figure 14B:
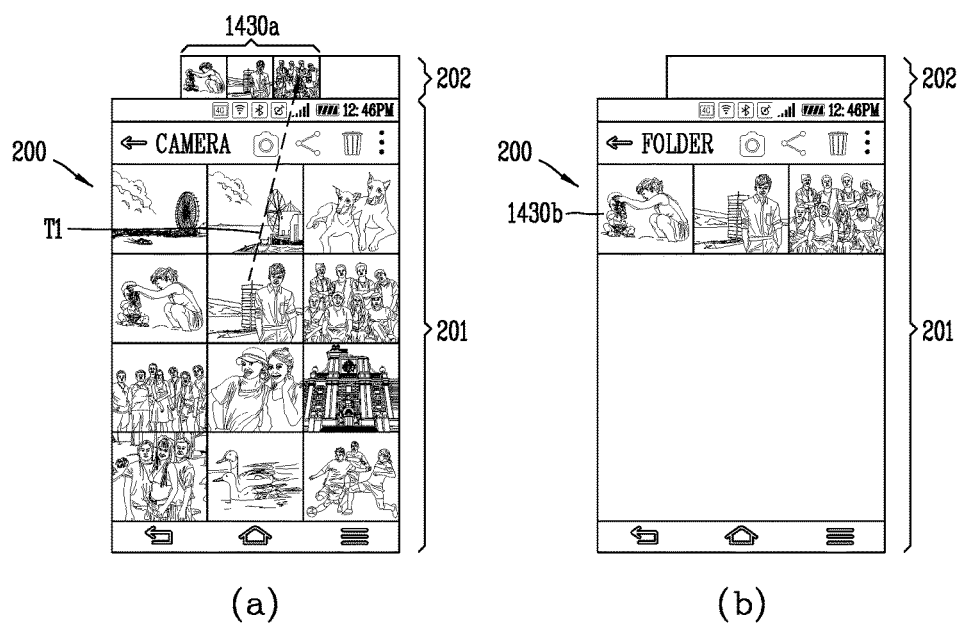

Then, when a drag touch (T1) started from the extended region 202 is released from the main region 201 in a state that at least one thumbnail 1430a is displayed in the extended region 202 as illustrated in FIG. 14B(a), the controller 180 may display at least one content corresponding to the at least one thumbnail in the main region 201 as illustrated in FIG. 14B(b).

Furthermore, a content corresponding to at least one thumbnail 1430a included in the extended region 202 may be grouped into one group (folder 1) as illustrated in FIG. 14B(b).

At this time, the grouping may be carried out on the assumption that a drag touch (T1) started from the extended region 202 is released from the main region 201 as illustrated in FIG. 14B(a). In other words, when a drag touch started from the extended region 202 is not released from the main region 201 even though at least one thumbnail is displayed in the extended region 202, the controller 180 may not group at least one content corresponding to the at least one thumbnail into one group.

However, the present disclosure may not be necessarily limited to this, and the grouping may be also carried out based on a drag touch (T4) started from any one content of a plurality of contents displayed in the main region 201 being released from the extended region 202. In other words, the controller 180 may group (add) content(s) from which the drag touch (T4) is started into one group whenever the drag touch (T4) is applied thereto.

On the other hand, when a drag touch (T6) started from the extended region 202 is released from a region other than the extended region 202 and the main region 201 in a state that at least one thumbnail 1430a is displayed in the extended region 202, the controller 180 may delete a content corresponding to the at least one thumbnail or limit the display of the at least one thumbnail based on a direction in which the drag touch is applied.

First, a method of limiting (or restricting) the display of at least one thumbnail will be described with respect to FIGS. 14C and 14D.

Figure 14C:
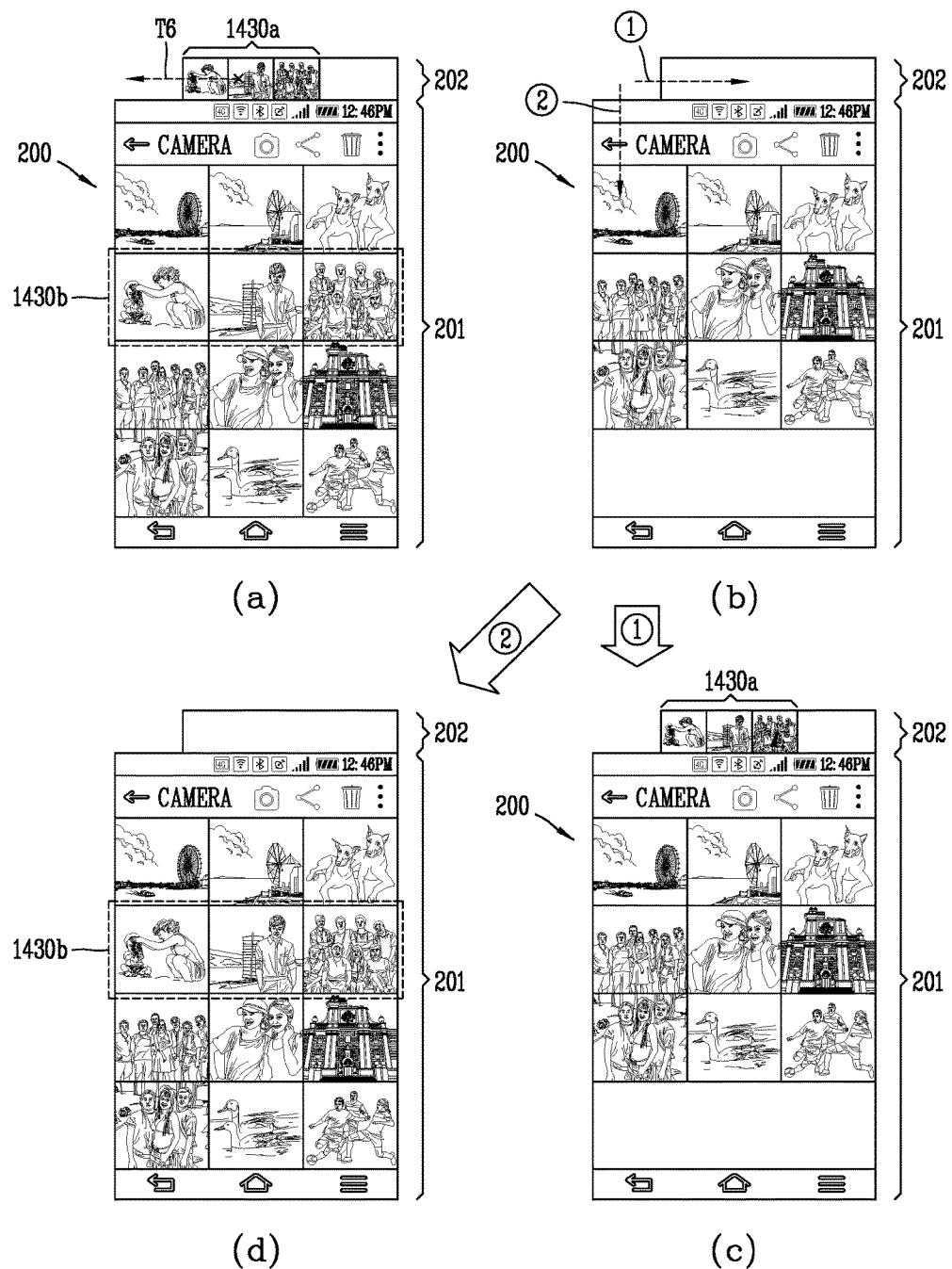

When a drag touch (T6) started from the extended region 202 is released from a region out of the extended region 202 and main region 201 in a state that at least one thumbnail 1430a is displayed in the extended region 202 as illustrated in FIG. 14C(a), the controller 180 may limit the display of the at least one thumbnail 1430a as illustrated in FIG. 14C(b). At this time, the controller 180 may limit the at least one thumbnail 1430a based on the drag touch (T6) being applied in one direction (for example, left direction) and then released from a region out of the extended region 202 and main region 201.

Furthermore, as illustrated in FIG. 14C(b), when the drag touch (T6) is applied thereto, the display of at least one content 1430b corresponding to the at least one thumbnail 1430a displayed in the main region 201 may be also limited.

At this time, though not shown in the drawing, an indicator indicating that a thumbnail (or content), the display of which is limited, may be displayed in at least one of the main region 201 and extended region 202 on the display unit 200.

Then, the controller 180 may display a thumbnail or content, the display of which is limited, on the display unit 200 based on a drag touch started from a position out of the extended region 202 and main region 201 being applied thereto.

For example, when a drag touch (①) started from a position out of the extended region 202 and main region 201 is released from the extended region 202, the controller 180 may display at least one thumbnail 1430a, the display of which is limited, in the extended region 202 as illustrated in FIG. 14C(c).

For another example, when a drag touch (②) started from a position out of the extended region 202 and main region 201 is released from the main region 201, the controller 180 may display at least one content 1430b corresponding to at least one thumbnail, the display of which is limited, in the main region 201 as illustrated in FIG. 14C(d).

Limiting the display of at least one thumbnail or at least one content as described above may be understood as a "hide" function.

On the other hand, displaying a content or thumbnail, the display of which is limited, may be carried out on the assumption that user authentication is successful.

Figure 14D:
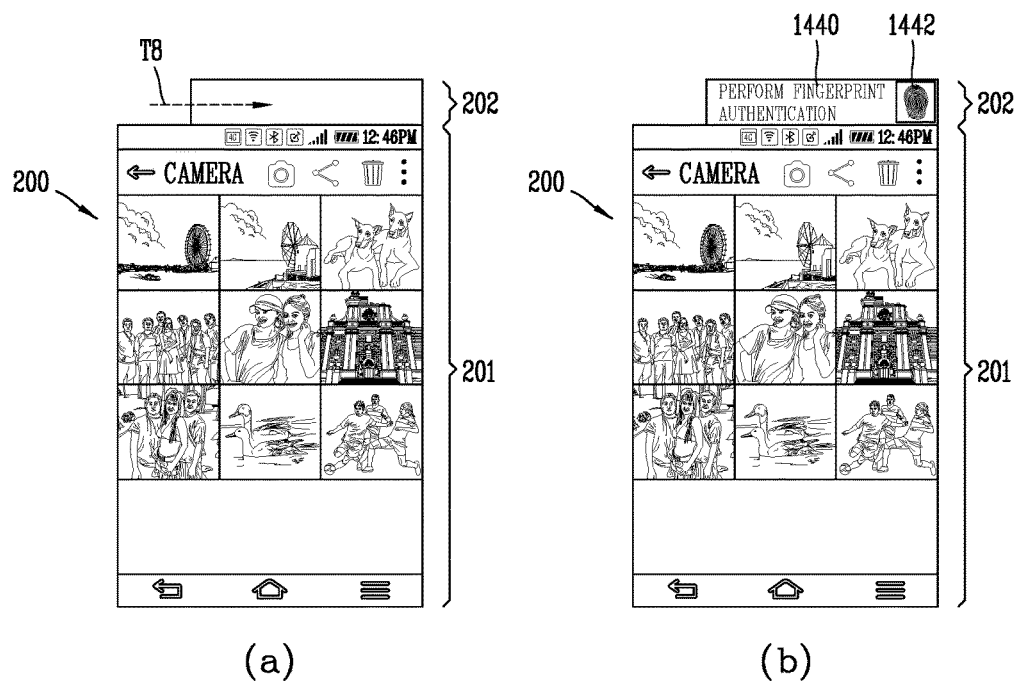
Figure 14D:
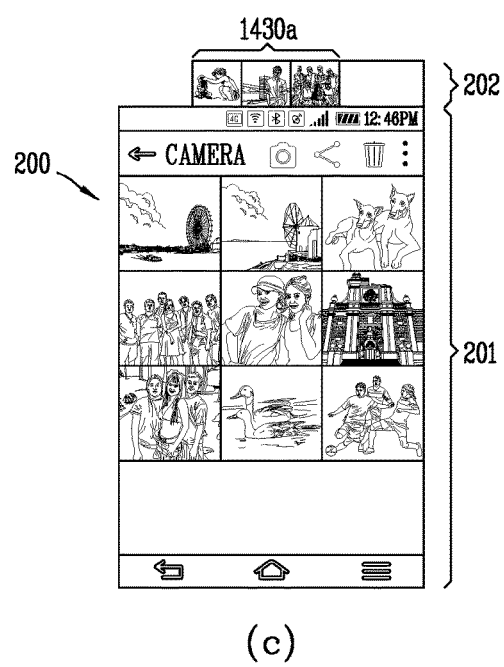

For example, when a drag touch (T8) started from a position out of the extended region 202 and main region 201 is released from any one (for example, extended region 202) of the extended region 202 and main region 201 in a state that the display of at least one thumbnail or at least one content is limited as illustrated in FIG. 14D(a), the controller 180 may display notification information 1440 for guiding user authentication on the display unit 200 (for example, extended region 202) as illustrated in FIG. 14D(b). Furthermore, when the user authentication is fingerprint authentication, an indicator 1242 for guiding a place allowing a user's fingerprint to be brought into contact with may be displayed on the display unit 200 (for example, extended region 202).

Then, when the user authentication is successful, the controller 180 may display at least one thumbnail 1430a or at least one content, the display of which is limited, on the display unit 200. For example, a drag touch (t8) applied in FIG. 14D(a) is released from the extended region 202, the controller 180 may display at least one thumbnail 1430a, the display of which is limited, in the extended region 202 based on the successfulness of the user authentication.

Though not shown in the drawing, when a touch is applied to an indicator indicating that there is a thumbnail (or content), the foregoing display of which is limited, the controller 180 may display the thumbnail (or content), the display of which is limited, on the display unit 200. Even in this case, the display may be carried out on the assumption of user authentication.

Figure 14E:
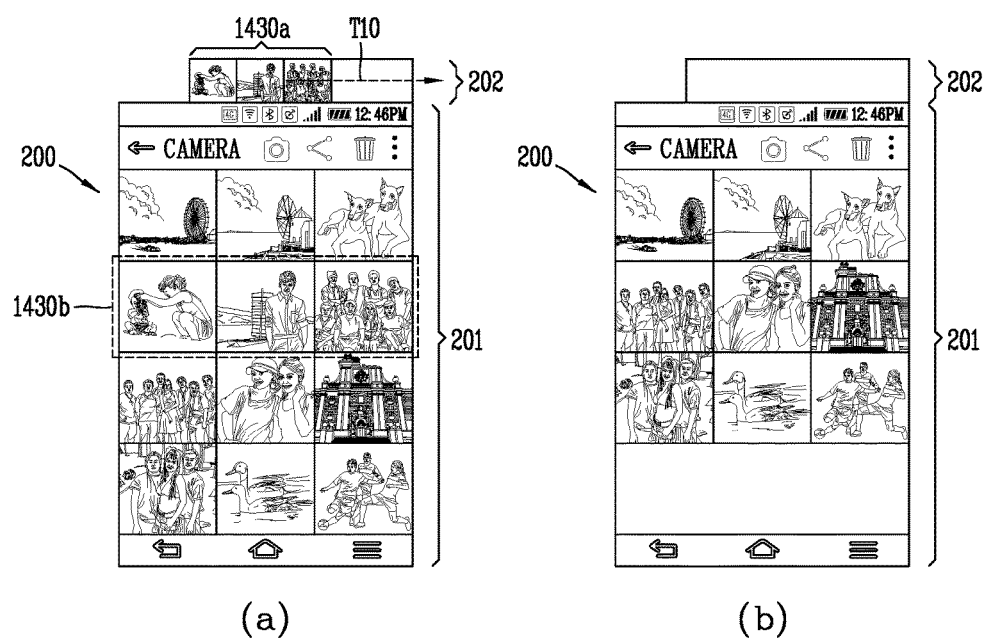

On the other hand, when a drag touch (T10) started from the extended region 202 is released from a region out of the extended region 202 and second magnetic force adjustment plate 210 in a state that at least one thumbnail 1430a is displayed in the extended region 202 as illustrated in FIG. 14E(a), the controller 180 may delete the at least one thumbnail 1430a as illustrated in FIG. 14E(b). At this time, the controller 180 may delete the at least one thumbnail 1430a based on the drag touch (T10) being applied in a direction (for example, right direction) different from one direction (for example, left direction) as illustrated in FIG. 14C(a) and then released from a region out of the extended region 202 and main region 201.

At this time, the controller 180 may delete only the at least one thumbnail 1430a based on the drag touch (T10). Furthermore, the controller 180 may also delete the at least one thumbnail 1430a and at least one content 1430b corresponding thereto at the same time based on the drag touch (T10) as illustrated in FIG. 14E(b).

In other words, as illustrated in FIG. 14E(b), when the drag touch (T10) is applied thereto, at least one content 1430b corresponding to the at least one thumbnail 1430a displayed in the main region 201 may be also deleted at the same time.

Through this configuration, according to the present disclosure, it may be possible to provide a user interface capable of grouping, hiding or deleting a plurality of contents in an optimized method using the main region and extended region.

On the other hand, according to the present disclosure, it may be possible to provide a user interface capable of displaying the execution screens of at least two applications at the same time on the display unit using the main region and extended region.

FIGS. 15A, 15B, 15C, 15D, 15E and 15F are conceptual views for explaining a method of executing a plurality of applications using an extended region.

First, according to the present disclosure, as a specific application is carried out, the screen information of the specific application may be displayed on the display unit 200. For example, as illustrated in FIG. 15A(a), when the specific application is a music related application, screen information associated with a first content may be displayed in the main region 201 of the display unit 200, and screen information associated with a second content may be displayed in the extended region 202 of the display unit 200.

Figure 15A:
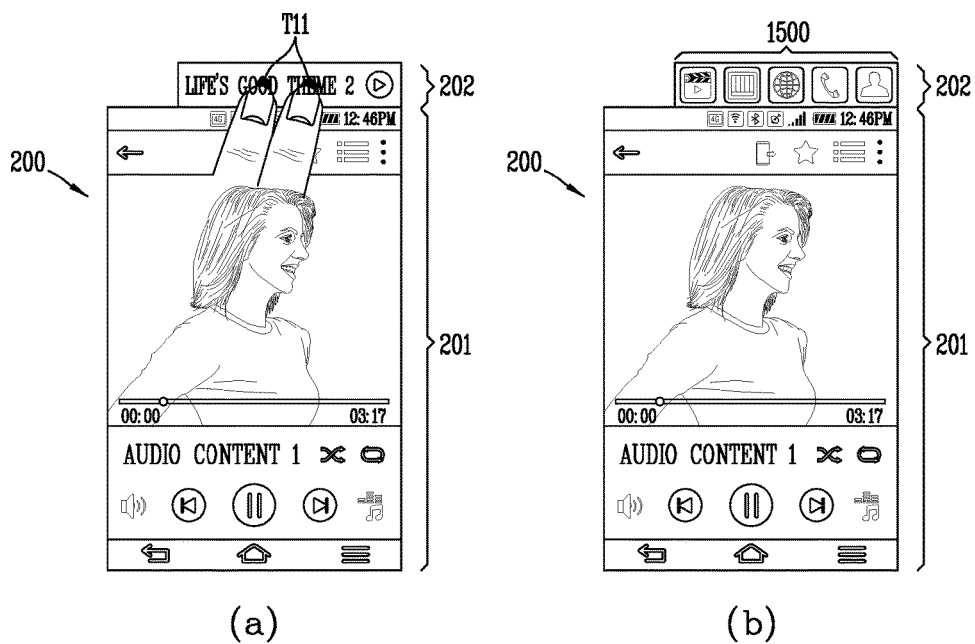
FIGS. 15A, 15B, 15C, 15D, 15E and 15F are conceptual views for explaining a method of executing a plurality of applications using an extended region.
Figure 15A:
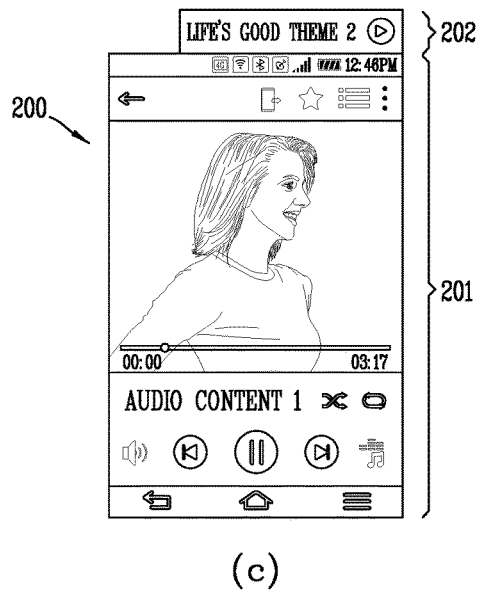

When a predetermined type of touch (for example, a double long touch maintaining the touch on at least two positions for a predetermined period of time) is applied to the extended region 202 as illustrated in FIG. 15A(a), the controller 180 may display at least one icon 1500 associated with an application in the extended region 202 as illustrated in FIG. 15A(b).

When a touch is not applied for a predetermined period of time subsequent to displaying the at least one icon 1500, the controller 180 may allow the displayed at least one icon 1500 to disappear as illustrated in FIG. 15A(c).

Figure 15B:
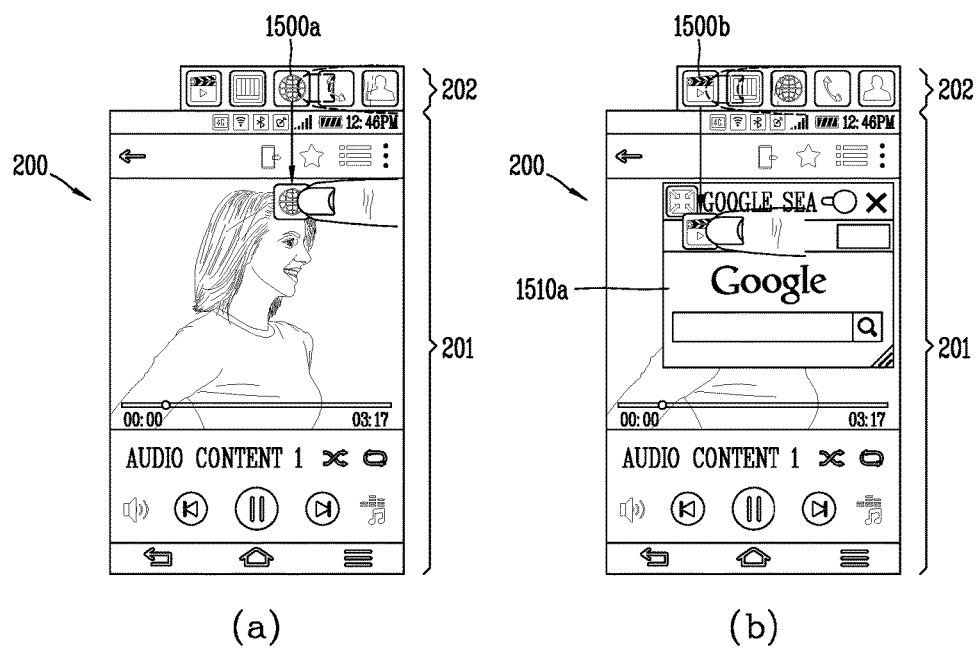
Figure 15B:
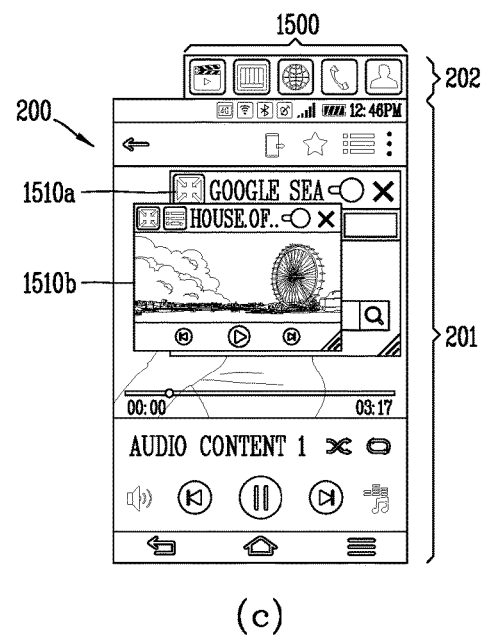

On the other hand, when a drag touch started from the any one icon 1500a among the at least one icon displayed in the extended region 202 is released from the main region 201 as illustrated in FIG. 15B(a), the controller 180 may display the execution screen 1510a of an application corresponding to the any one icon on at least part (or partial portion) of the main region 201 as illustrated in FIG. 15B(b). In this case, at least part of screen information displayed in the main region 201 prior to applying the drag touch may not be seen by the execution screen 1510a of the application. A location at which the execution screen 1510a of the application is displayed may be determined based on a position from which the drag touch is released.

Then, when a drag touch started from an icon 1500b different from the any one icon 1500a is released from the main region 201 in a state that the execution screen 1510a of an application is displayed on at least part of the main region 201 as illustrated in FIG. 15B(b), the controller 180 may display the execution screen 1510b of an application corresponding to the different icon 1500b on at least part (or partial portion) of the main region 201 as illustrated in FIG. 15B(c).

At this time, when the application execution screen 1510a overlaps with the application 1510b, the execution screen 1510b of an application displayed later may be displayed, but at least part of the execution screen 1510a of an application displayed first may not be displayed by the application execution screen 1510b as illustrated in FIG. 15B(c).

Figure 15C:
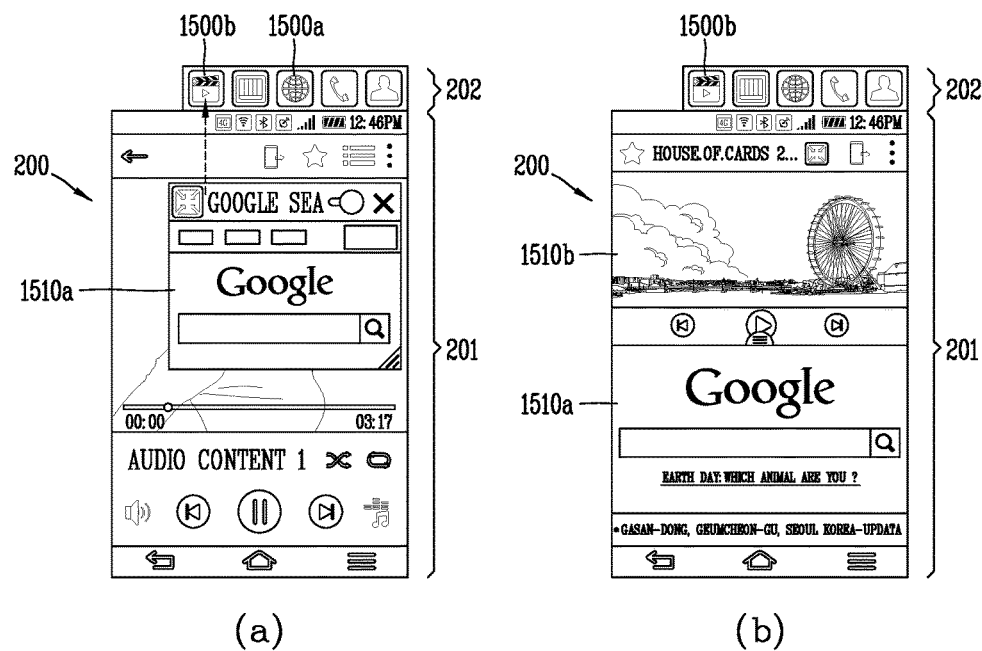

On the other hand, as illustrated in FIG. 15C(a), a drag touch started from one position of the execution screen 1510a (for example, a title bar of the execution screen) may be released from the second icon 1500b different from the first icon 1500a displayed in the extended region 202 in a state that the execution screen 1510a of an application corresponding to the first icon 1500a is displayed on at least part of the main region 201. In this case, the execution screens 1510a, 1510b may be displayed in the main region 201 in a non-overlapping manner with each other while having the same size. For example, here, the size of the execution screens 1510a, 1510b may be 1/n (here, n is a number of execution screens) of a size of the main region 201 (or a size excluding a status bar in the main region 201).

Furthermore, as illustrated in FIG. 15C(b), the display location of the execution screens 1510a, 1510b may be determined based on a sequence in which the execution screens are displayed, and for an example, the execution screen 1510b displayed later may be displayed on an upper side than the execution screen 1510a displayed first.

Figure 15D:
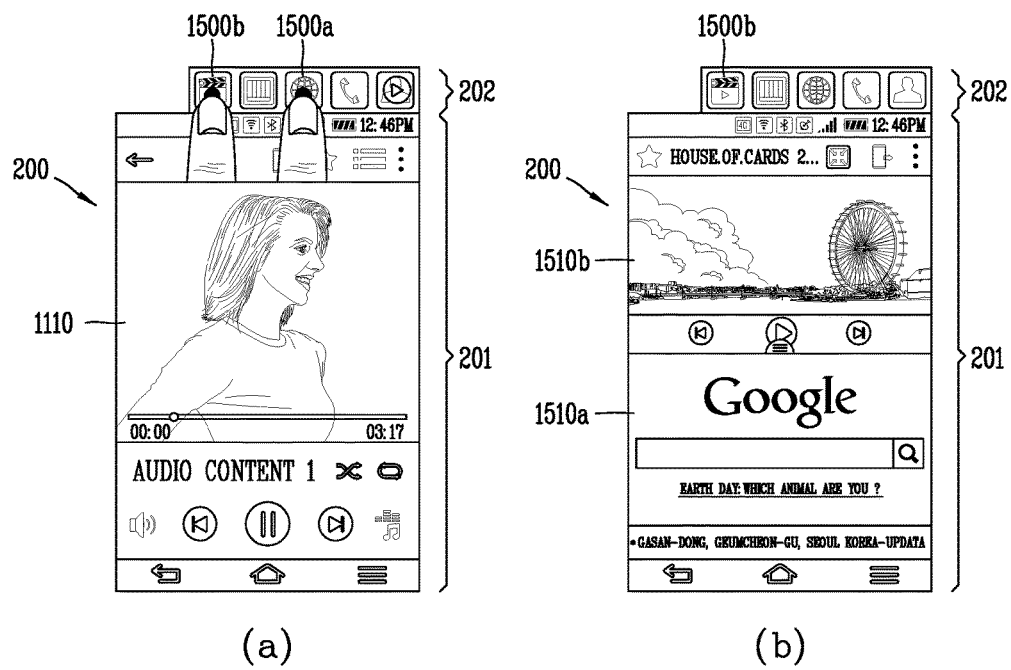

For another example, when at least two touches are applied to at least two icons 1500a, 1500b and the at least two touches are maintained for a predetermined period of time in a state that a plurality of icons are displayed in the extended region 202 as illustrated in FIG. 15D(a), the controller 180 may display the execution screens 1510a, 1510b of applications corresponding to the at least two icons at the same time in the main region 201 as illustrated in FIG. 15D(b).

In this case, the execution screens 1510a, 1510b may be displayed in the main region 201 in a non-overlapping manner with each other while having the same size. For example, the size of the execution screens 1510a, 1510b may be 1/n (here, n is a number of execution screens) of a size of the main region 201 (or a size excluding a status bar in the main region 201).

Figure 15E:
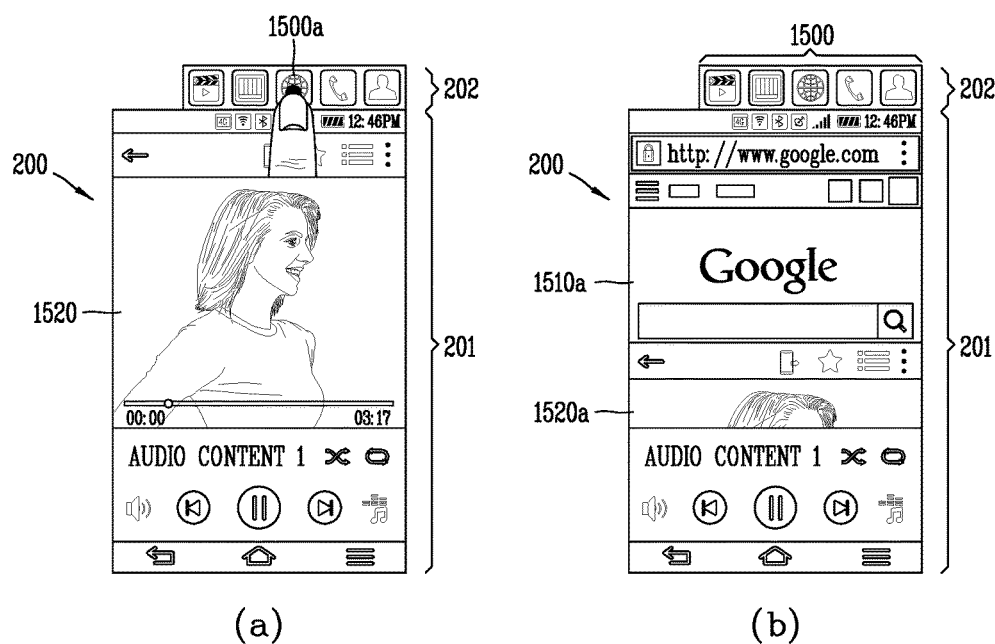

On the other hand, as illustrated in FIG. 15E(a), a touch may be applied to any one icon 1500a of at least one icon displayed in the extended region 202 in a state that the a specific screen information 1520 is previously displayed in the main region 201, and then a long touch maintaining the touch for a predetermined period of time may be applied thereto. In this case, the controller 180 may display a part portion 1520a of the specific screen information and the execution screen 1510a of an application corresponding to the any one icon at the same time based on the long touch. In this case, the partial portion 1520a of the specific screen information and the execution screen 1510a of the application may be displayed in the main region 201 in a non-overlapping manner with each other while having the same size.

Though not shown in the drawing, when a short touch is applied to any one of a plurality of icons displayed in the extended region 202, the controller 180 may display the execution screen of an application corresponding to the any one icon to which the short touch has been applied instead of screen information previously displayed in the main region 201.

Figure 15F:
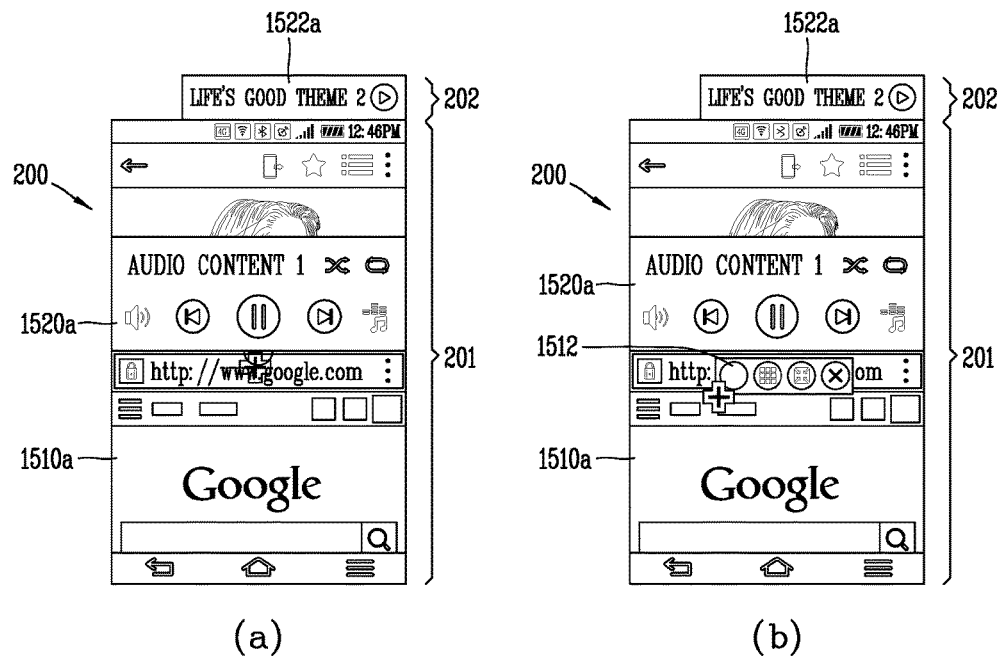
Figure 15F:
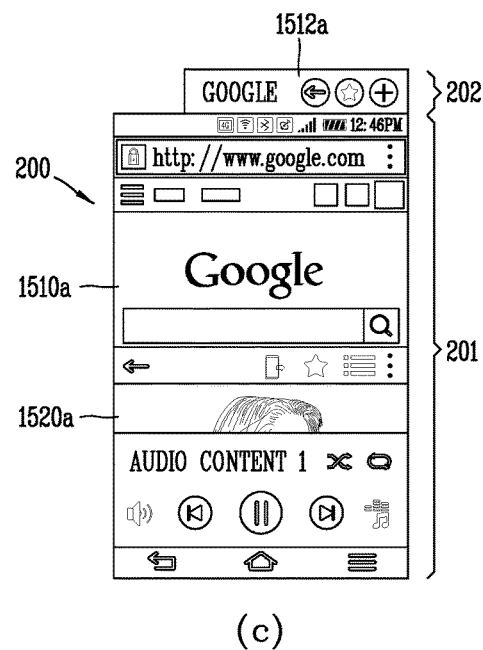

On the other hand, as illustrated in FIG. 15F(a), when a touch is not applied to the display unit 200 for a predetermined period of time in a state that the execution screen execution screen 1510a of a first application and the execution screen 1520a of a second application are displayed at the same time in the main region 201, at least one icon that has been displayed in the extended region 202 may disappear. In this case, screen information associated with any one application between the first and the second application may be displayed in the extended region 202.

At this time, as illustrated in FIG. 15F(a), the controller 180 may display screen information 1522a associated with an application corresponding to the execution screen (execution screen 1520a of the second application) displayed at an upper side between the execution screens 1510a, 1510b in the extended region 202.

On the other hand, a graphic object for displaying a menu icon may be displayed on a partial portion of the extended region 202 as illustrated in FIG. 15F(a). When the graphic object is selected, as illustrated in FIG. 15F(b), the controller 180 may display at least one menu icon. When a menu icon 1512 linked to a function of exchanging the locations of execution screens among the at least one menu icon is touched, as illustrated in FIG. 15F(c), the controller 180 may exchange the display locations of the execution screens 1520a, 1520b of a first and a second application to each other as illustrated in FIG. 15F(c).

In this case, as illustrated in FIG. 15F(c), the execution screen 1510a of the first application may be displayed at an upper side than the execution screen 1520a of the second application. Accordingly, screen information 1512a associated with the first application may be displayed in the extended region 202.

However, the present disclosure may not be necessarily limited to this, the controller 180 may display screen information associated with an application corresponding to an execution screen (or active execution screen) to which a touch is applied most lately between the execution screens of the first and the second application in the extended region 202.

For example, as illustrated in FIG. 15F(a), even when the execution screen 1520a of the second application is displayed at an upper side than the execution screen 1510a of the first application, when a touch is applied most lately to the execution screen 1510a of the first application, screen information associated with the first application other than screen information associated with the second application may be displayed in the extended region 202.

Through the foregoing configuration, according to the present disclosure, it may be possible to provide a UI/UX capable of displaying the execution screens of at least two applications in a more optimized method using the main region and extended region.

On the other hand, according to the present disclosure, contact information may be grouped in various methods using the main region and extended region.

Figure 16A:
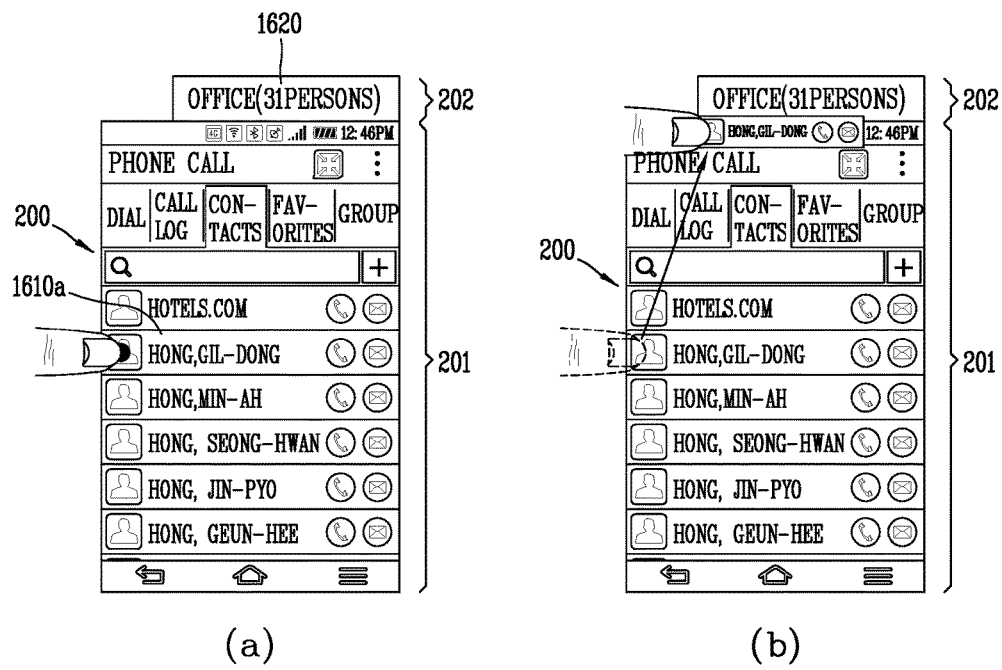
FIGS. 16A and 16B are conceptual views for explaining a method of grouping contents corresponding to contact information.
Figure 16A:
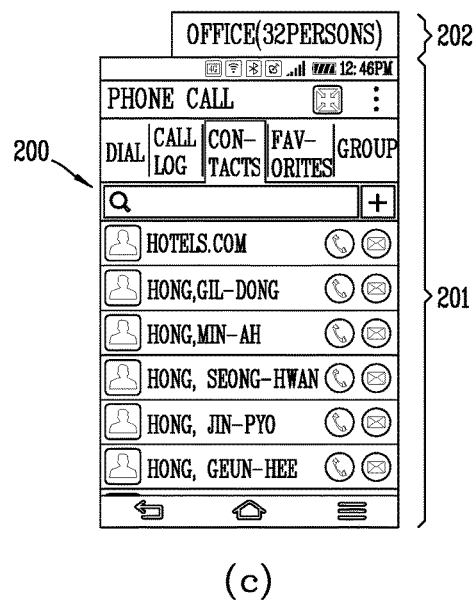
Figure 16B:
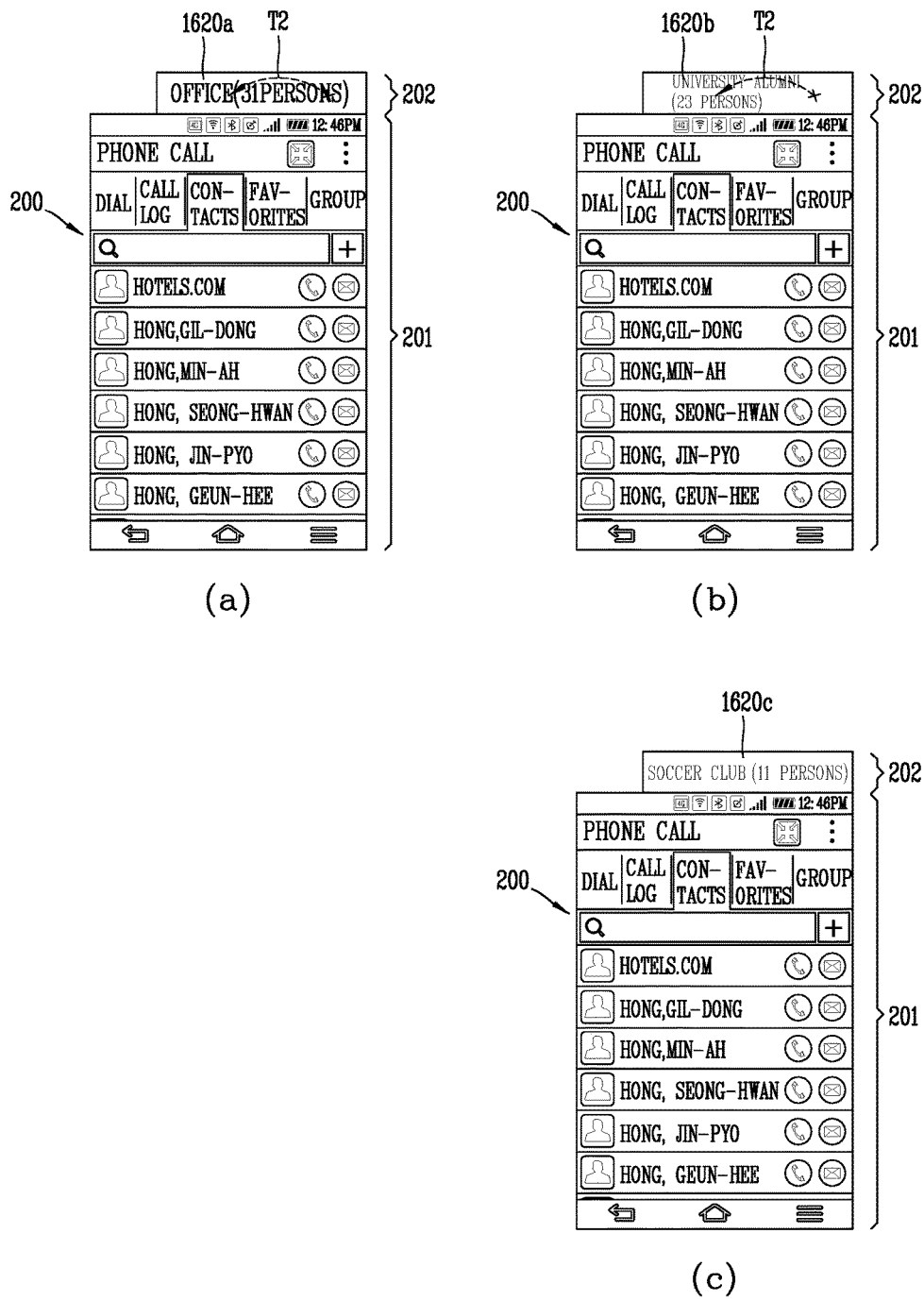

FIGS. 16A and 16B are conceptual views for explaining a method of grouping contents corresponding to contact information.

Hereinafter, a case where the content of the present disclosure is contact information will be described as an example.

As illustrated in FIG. 16A(a), at least one contact information 1610 stored in the memory 170 may be displayed in the main region 201. The group information of any group may be display in the extended region 202. The group may have the concept of a folder as described above or the concept of category information linked to each contact information. The group information may include a group name, a number of contact information included in the relevant group, and the like.

In other words, contact information linked to the same category information may be understood as being grouped into one group.

When a drag touch started from any one contact information 1610a of the at least one contact information 1610 displayed in the main region 201 is released from the extended region 202, the controller 180 may group (add) it into a group corresponding to any group information displayed in the extended region. In other words, when a drag touch started from the any one contact information 1610a is released from the extended region 202, the controller 180 may apply (link, set, change) category information corresponding to group information displayed in the extended region 202 to the any one contact information.

For another example, when a touch is maintained for a predetermined period of time on any one contact information 1610a of the at least one contact information 1610 displayed in the main region 201, the controller 180 may generate an image corresponding to the contact information 1610a.

The image may be displayed while the touch is maintained. Furthermore, the image may move dependent on a touch consecutively subsequent to the touch.

For example, as illustrated in FIG. 16A(b), an image corresponding to the any one contact information 1610a may move dependent on a touch consecutively applied to a touch maintained on the any one contact information 1610a for a predetermined period of time.

In this state, when the consecutively applied touch is released from the extended region 202, as illustrated in FIG. 16A, the any one contact information 1610a may be grouped (added) to a group corresponding to any group information displayed in the extended region.

On the other hand, when a predetermined type of touch (for example, drag touch) (T2) is applied to the extended region 202 in a state that first group information 1620a is displayed in the extended region 202 as illustrated in FIG. 16B(a), the controller 180 may display second group information 1620b different from the first group information in the extended region 202 as illustrated in FIG. 16B(b). Similarly, when a predetermined type of touch (for example, drag touch) (T2) is applied to the extended region 202 in a state that second group information is displayed in the extended region 202, the controller 180 may display third group information 1620c different from the second group information as illustrated in FIG. 16B(c). The first and the third group may be the same group or different groups as illustrated in FIG. 16B(c).

Through the foregoing configuration, according to the present disclosure, it may be possible to more conveniently group contact information using the main region and extended region.

On the other hand, the present disclosure may control screen information associated with the Internet using the main region and extended region.

Figure 17A:
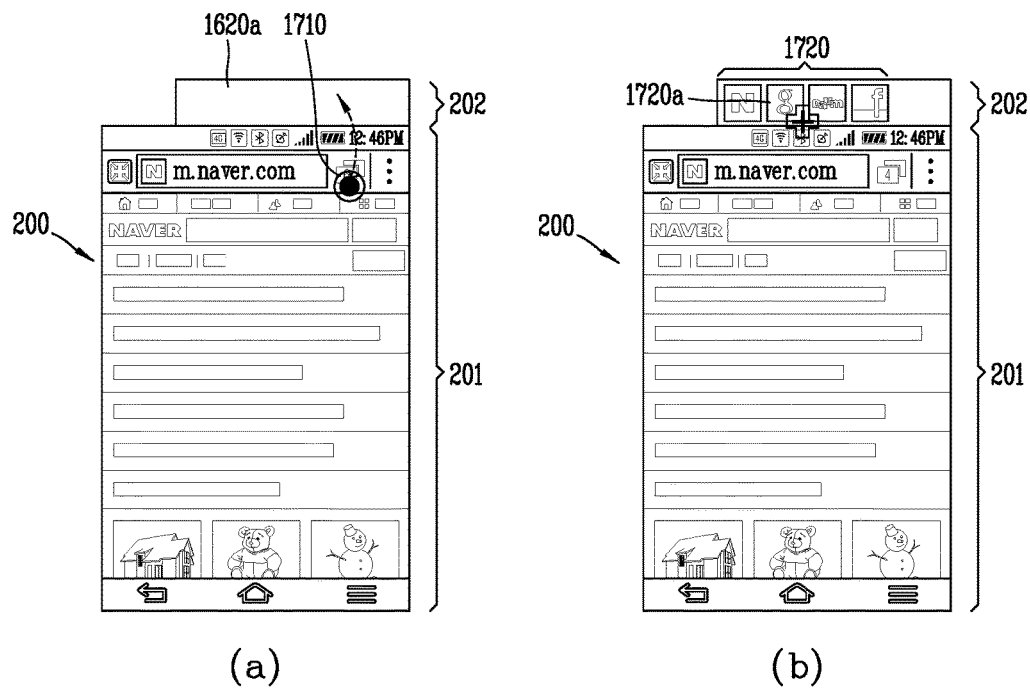
FIGS. 17A, 17B and 17C are conceptual views for explaining a method of controlling an application associated with the Internet using a main region and an extended region.
Figure 17A:
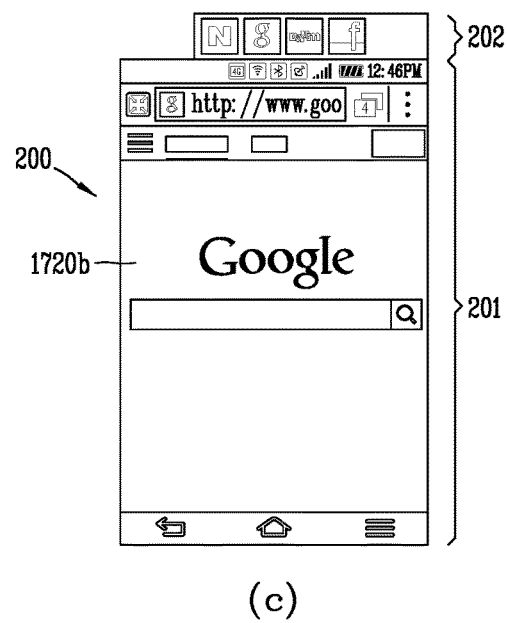
Figure 17B:
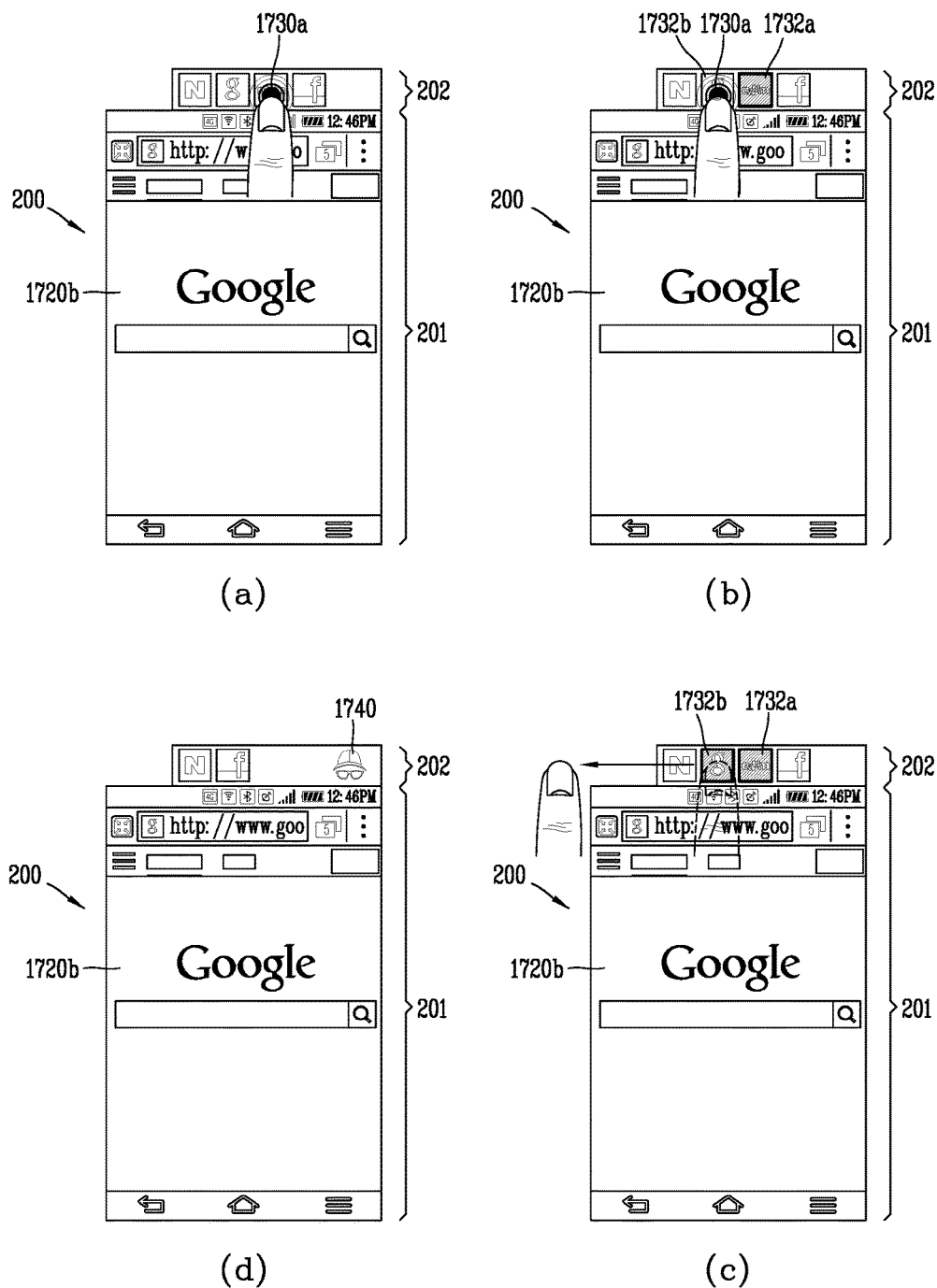
Figure 17C:
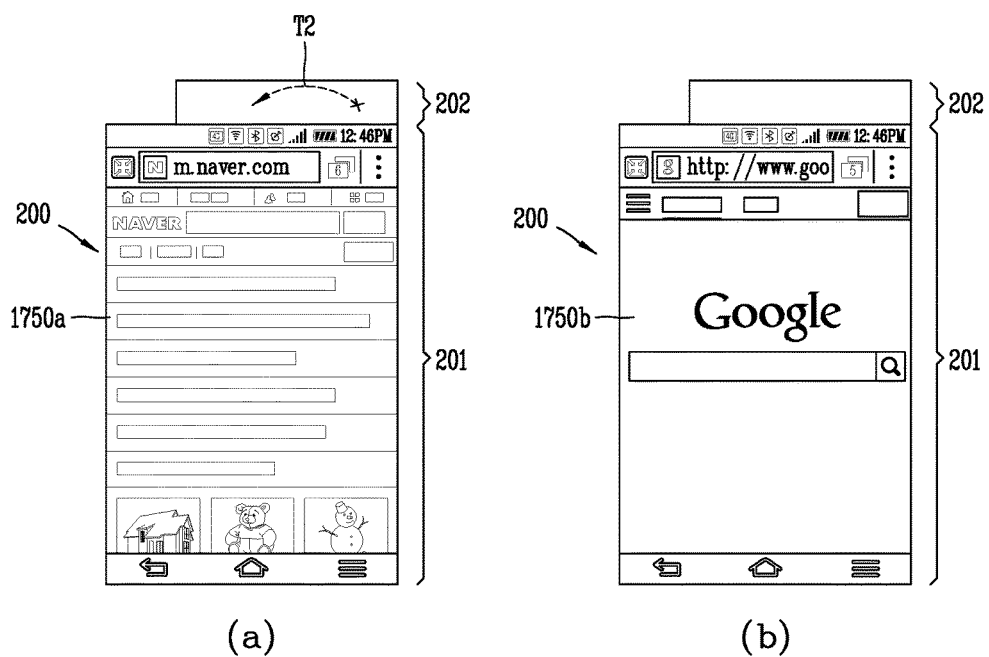

FIGS. 17A, 17B and 17C are conceptual views for explaining a method of controlling an application associated with the Internet using a main region and an extended region.

Referring to FIG. 17A, when an application (or web browser) associated with the Internet is implemented based on a user's request, screen information (for example, webpage) associated with the Internet may be displayed in the main region 201.

An application associated with the Internet may implement (or activate, generate) at least one tab (or browser tab) based on a user's request. Each tab may include a webpage in an independent manner. When a plurality of tabs are implemented, the plurality of tabs, respectively, may include a different webpage.

A webpage included in any on tab of the plurality of tabs may be displayed in the main region 201. In this case, the any one tab may be referred to as an active state, and the remaining tabs may be referred to as an inactive state.

Furthermore, an icon 1710 indicating a number of the implemented tabs may be displayed in the main region 201. When a touch is applied to the icon 1710, the controller 180 may display graphic objects corresponding to a plurality of tabs to select any one tab of the plurality of tabs.

On the other hand, as illustrated in FIG. 17A(a), when a drag touch started from the main region 201 (or the icon 1710) is released from the extended region 202 in a state that a webpage included in any one tab is displayed in the main region 201, the controller 180 may display an icon 1720 representing a webpage included in a tab currently being implemented. The number of icons 1720 may be the same as that of the implemented tabs.

As illustrated in FIG. 17A(b), when any one 1720a of icons 1720 displayed in the extended region 202 is touched, the controller 180 may activate a tab including a webpage 1720b corresponding to the touched icon 1720a, and display the webpage 1720b included in the activated tab in the main region 201.

On the other hand, when a predetermined type of touch (for example, long touch maintained for a predetermined period of time) is applied to any one 1730a of the at least one icon in a state that at least one icon is displayed in the extended region 202 as illustrated in FIG. 17B(a), the controller 180 may select the any one icon 1730a as illustrated in FIG. 17B(b). At this time, the controller 180 may change a graphic effect 1732a to indicate that the any one icon 1730a has been selected.

Furthermore, as illustrated in FIG. 17B(b), when the predetermined type of touch is applied to an icon 1730b different from the any one icon, the controller 180 may select the different icon 1730b along with the any one icon 1730a.

Then, when a drag touch started from the extended region 202 and released from a position out of the extended region 202 and main region 201 is sensed in a state that at least one icon 1732a, 1732b is selected as illustrated in FIG. 17B(c), the controller 180 may allow the selected icon 1732a, 1732b to disappear from the extended region 202 as illustrated in FIG. 17B(d).

A tab (or tabs) including a webpage corresponding to the selected icon 1732a, 1732b may be deleted (the implementation thereof is ended) or switched to a privacy mode (or secret mode). The privacy mode may be a mode in which data (for example, personal information, search history, cookie, web cache, etc.) associated with a webpage implemented on the relevant tab is not stored in the memory 170.

When the tab (or tabs) are switched to a privacy mode, an icon 1740 indicating that there exists a tab being implemented in the privacy mode may be displayed in the extended region 202 as illustrated in FIG. 17B(d).

Then, the controller 180 may display the disappeared icons 1732a, 1732b in the extended region 202 based on a drag touch started from a position out of the main region 201 and extended region 202 being released form the extended region 202.

At this time, a tab (or tabs) including a webpage corresponding to the icons 1732a, 1732b may be switched from a privacy mode to a general mode.

On the other hand, though not shown in the drawing, when a touch is applied to the icon 1740, the controller 180 may display the disappeared icon 1732a, 1732b in the extended region 202 or display only the disappeared icon 1732a, 1732b in the extended region 202.

On the other hand, when a predetermined type of touch (for example, drag touch) (T2) is applied to the extended region 202 as illustrated in FIG. 17C(a), the controller 180 may display a second webpage different from the first webpage in the main region 201 instead of the first webpage 1750a displayed in the main region 201 as illustrated in FIG. 17C(b).

Through the foregoing configuration, the present disclosure may provide a user interface capable of allowing a user to easily select/change his or her desired tab among a plurality of tabs using the main region and extended region, and more easily switching the mode of a tab.

On the other hand, the present disclosure may control a content using the main region 201 and extended region 202 on the display unit 200 while the display unit 200 is in an inactive state.

Figure 18A:
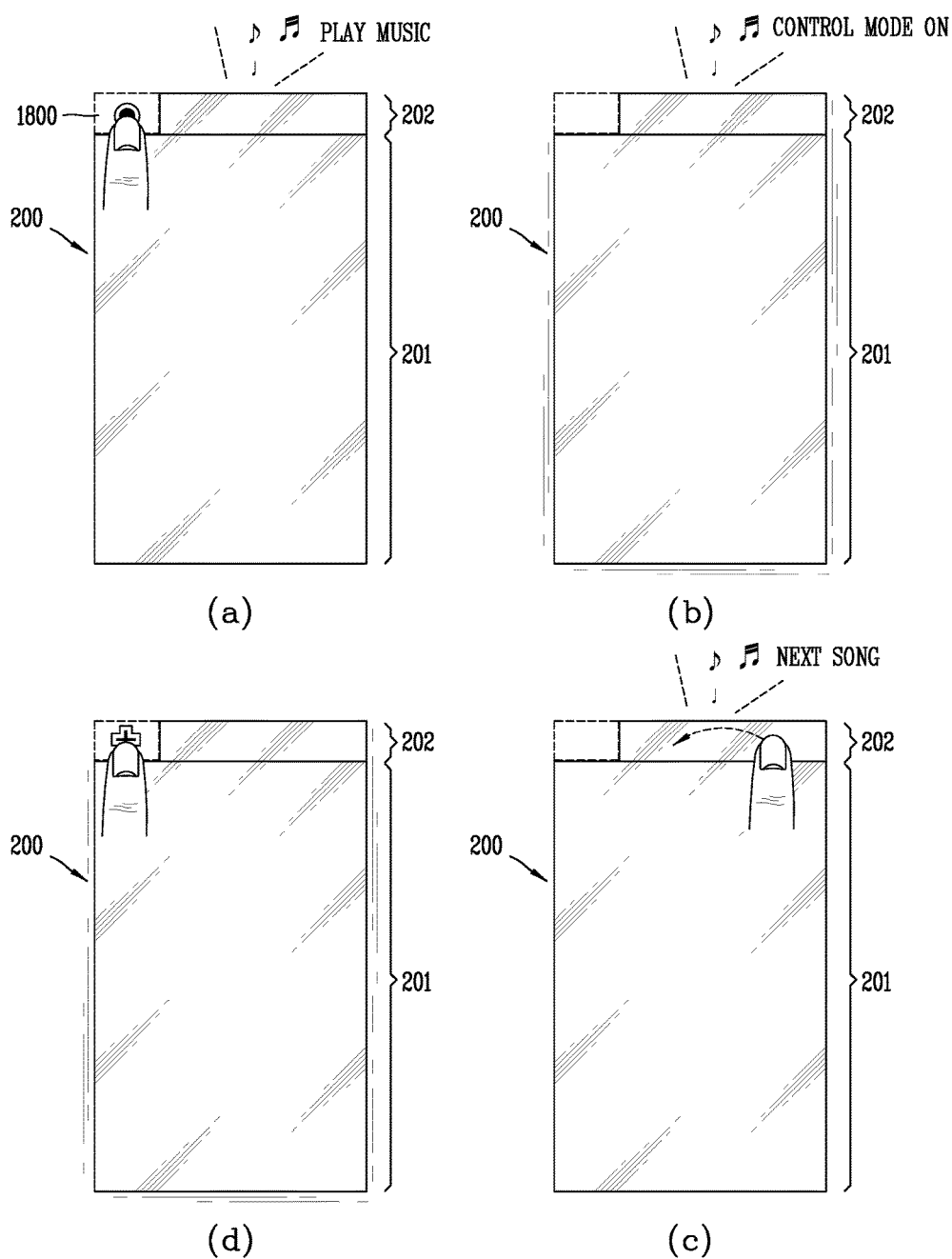
FIGS. 18A, 18B and 18C are conceptual views for explaining a method of controlling contents using a main region and an extended region in a state that the display unit is in an inactive state.
Figure 18B:
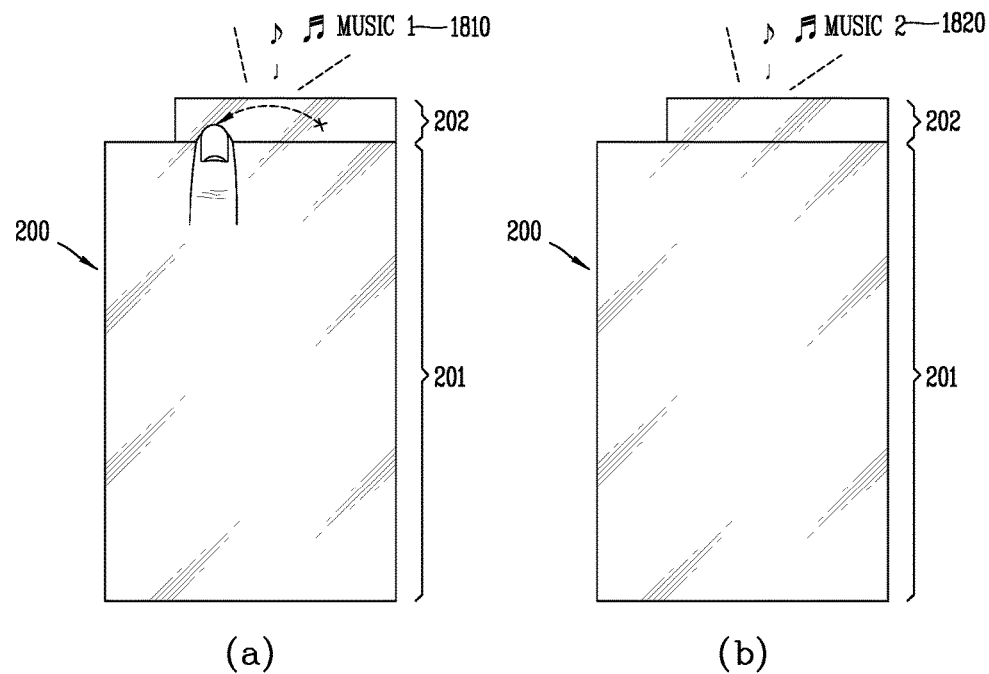
Figure 18B:
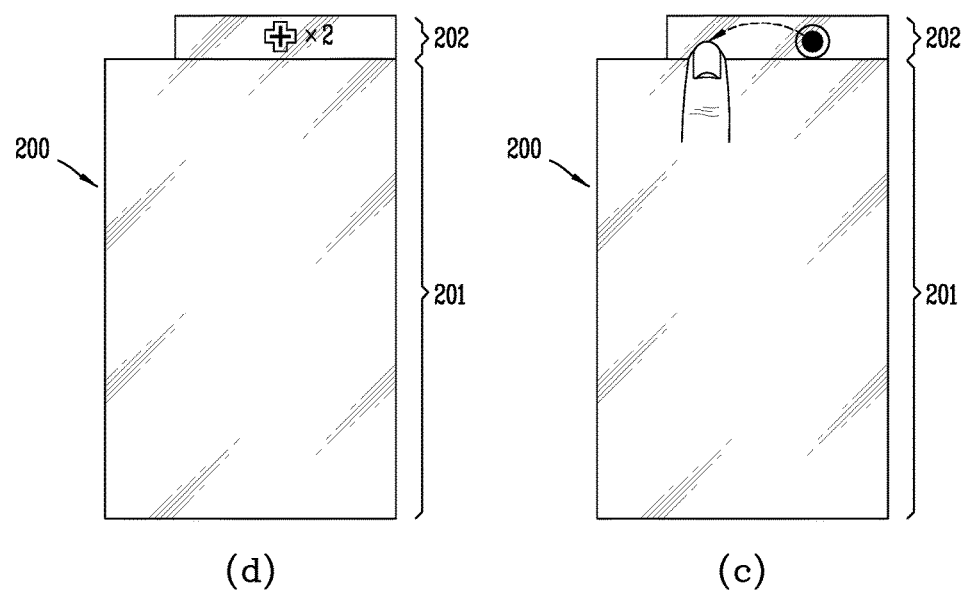
Figure 18C:
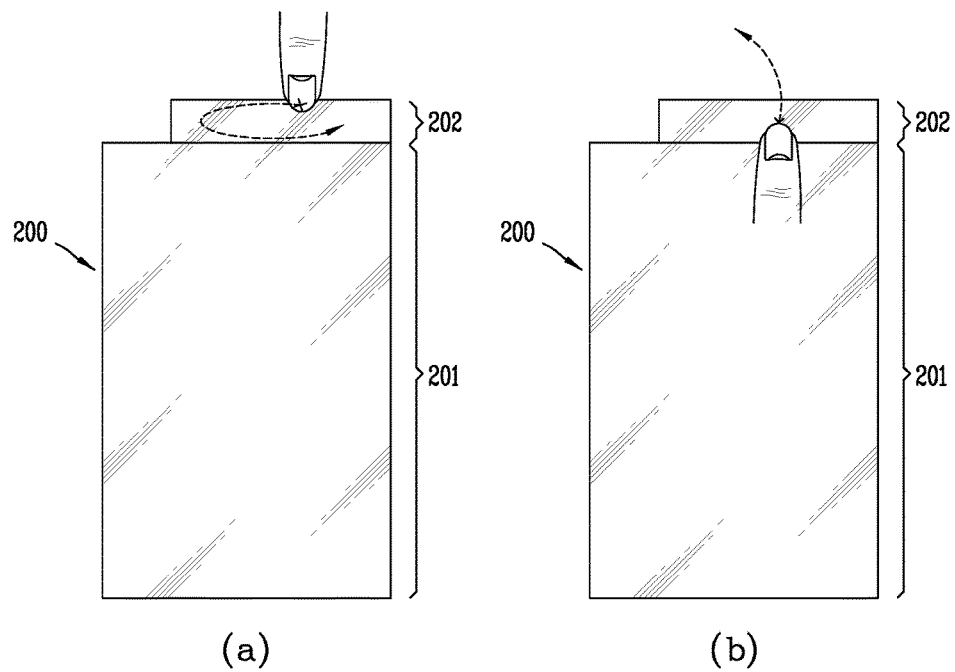

FIGS. 18A, 18B and 18C are conceptual views for explaining a method of controlling contents using a main region and an extended region in a state that the display unit is in an inactive state.

The display unit 200 in an inactive state may denote a state in which a light emitting device included in the display unit 200 is turned off. According to the present disclosure, even when the display unit 200 is in an inactive state, the display unit 200 may be formed to sense a touch applied to the display unit 200.

Furthermore, a mobile terminal according to the present disclosure may be formed to sense a touch applied to a region out of the display unit 200. For example, as illustrated in FIG. 18A(a), the controller 180 may sense a predetermined type of touch applied to one region 1800 out of the main region 201 and extended region 202. To this end, a touch panel (or touch sensor) according to the present disclosure may be formed to correspond to the main region 201, extended region 202 and one region 1800.

The predetermined type of touch may include a short (or tap) touch, a long touch, a double touch, a multi touch, a drag touch, a flick touch, a pinch-in touch, a pinch-out touch, a swype touch, a hovering touch, and the like.

For example, as illustrated in FIG. 18A(a), when a predetermined type of touch is applied to one region 1800 out of the main region 201 and extended region 202 while the display unit 200 is in an inactive state, the controller 180 may implement a music related application. Furthermore, when the music related application is carried out, the controller 180 may play back any one content (music). At this time, the controller 180 may enter a state (mode) capable of controlling the content based on the predetermined type of touch. In this case, as illustrated in FIG. 18A(b), the controller 180 may output notification information (for example, vibration or notification sound) to indicate a state or mode capable of controlling the content.

On the other hand, when a predetermined type of touch is applied to the one region 1800 in a state that any content is being played back, the controller 180 may enter a state (mode) capable of controlling the content.

Then, the controller 180 may control the content based on a predetermined type of touch applied to the display unit 200 while the display unit 200 is maintained in an inactive state.

For example, as illustrated in FIG. 18A(c), in case of entering a state capable of controlling the content, when a predetermined type of touch (for example, drag touch) is applied to the extended region 202 of the display unit 200 in an inactive state, the controller 180 may play back another content instead of a content currently being played back.

Then, when a predetermined type of touch is applied again (or when a touch is not applied for a predetermined period of time) to one region 1800 out of the main region 201 and extended region 202 in a state capable of controlling the content, the controller 180 may release the state capable of controlling the content. The controller 180 may output notification information (vibration or sound) based on the release.

Considering more various embodiments of FIG. 18A(c), when a predetermined type of touch (for example, drag touch) is applied to the extended region 202 of the display unit 200 in an inactive state in a state that any content 1810 is being played back as illustrated in FIG. 18B(a), the controller 180 may play back a content 1820 different from the any content 1810 as illustrated in FIG. 18B(b).

On the other hand, as illustrated in FIG. 18B(c), when a touch is maintained for a predetermined period of time on one position of the display unit 200 in an inactive state and then a touch extended from the touch is moved by a predetermined distance and then released, the controller 180 may change the playback location (time) of a content currently being played back.

On the other hand, as illustrated in FIG. 18B(d), when at least two touches are sensed within a refrigerator period of time on one region of the display unit 200 in an inactive state in a state capable of controlling the content, the controller 180 may pause a content being played back or play back a paused content.

On the other hand, as illustrated in FIG. 18C(a), when a drag touch is applied to the display unit 200 in an inactive state to have a predetermined pattern in a state of capable of controlling the content (for example, a touch extended in one direction by a predetermined distance from a position to which the touch is applied and then extended in a direction opposite to said one direction by the predetermined distance is applied), the controller 180 may add a content currently being played back to a playlist different from a playlist which is a current playback object.

Furthermore, as illustrated in FIG. 18C(b), when a drag touch started from one region (for example, extended region 202) of the display unit in an inactive state is released from a position out of the display unit 200 in a state capable of controlling the content, the controller 180 may delete the content currently being played back from a playlist which is a current playback object.

Through the foregoing configuration, according to the present disclosure, it may be possible to provide a UI/UX capable of controlling a content in various ways while the display unit is in an inactive state.

As described above, the present disclosure may include a single display unit including a main region and an extended region formed to be extended in at least one direction of the main region, and provide a UI/UX capable of controlling a content with an optimized method using the main region and extended region.

Furthermore, the present disclosure may provide a new user interface capable of providing various functions based on various types of touches applied to at least one of the main region and extended region.

Furthermore, the present disclosure may provide a UI/UX capable of more easily displaying or playing back information associated with a content different from any content in a state that the playback of the any content is maintained using the main region and extended region.

Furthermore, the present disclosure may provide a control method capable of grouping a plurality of contents in an optimized method using the main region and extended region.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a display module comprising a main region and an extended region that extends in at least one direction from the main region; and
   a controller configured to control a prescribed content and display of screen information related to the prescribed content based on inputs at the main region and the extended region,
   wherein the prescribed content is controlled in a different mode based on a region to which a predetermined type of touch is sensed among the main region and the extended region in a state in which screen information associated with the prescribed content is displayed on the display module,
   wherein screen information associated with a content different from the prescribed content is displayed on the display module based on the predetermined type of touch sensed at any one region of the main region and the extended region, and
   wherein when the predetermined type of touch is sensed at the extended region, the controller displays screen information associated with the different content in the main region and the extended region in a state in which the playback of the prescribed content is maintained.

2. The mobile terminal of claim 1, wherein the controller controls the prescribed content in a first mode based on the predetermined type of touch sensed at the main region, and controls the prescribed content in a second mode different from the first mode based on the predetermined type of touch applied to the extended region.

3. The mobile terminal of claim 2,
   wherein the controller plays back the different content instead of the prescribed content when the predetermined type of touch is sensed at the main region, and maintains the playback of the prescribed content when the predetermined type of touch is sensed at the extended region.

4. The mobile terminal of claim 1, wherein when a drag touch started from the extended region and released at the main region is sensed in a state in which the prescribed content is being played back and screen information associated with the different content is displayed in the main region and the extended region, the controller suspends the playback of the prescribed content, and plays back the different content.

5. The mobile terminal of claim 1, wherein screen information associated with a first content is displayed in the main region, and
   screen information associated with a second content different from the first content is displayed in the extended region.

6. The mobile terminal of claim 5, wherein the controller controls the display module in a different mode based on a position from which a drag touch started from the extended region is released.

7. The mobile terminal of claim 6, wherein when the drag touch is released within the extended region, the controller displays screen information associated with a third content different from the second content, instead of screen information associated with the second content, in the extended region in a state in which the display of screen information associated with the first content is maintained in the main region.

8. The mobile terminal of claim 6, wherein when the drag touch is released at a position outside the extended region, the controller performs a different function based on a direction in which the drag touch is sensed.

9. The mobile terminal of claim 8, wherein the controller displays screen information associated with the second content in the main region when the drag touch is sensed in a first direction and then released at a position outside the extended region, and adds the second content to a second playlist different from a first playlist associated with a current playback object when the drag touch is sensed in a second direction different from the first direction and then released at a position outside the extended region.

10. The mobile terminal of claim 9, wherein when a drag touch started from a position outside the extended region is sensed in a direction opposite to the second direction and then released at the extended region, the controller displays screen information corresponding to the second playlist instead of screen information associated with the second content in the extended region.

11. The mobile terminal of claim 10, wherein when a drag touch started from the extended region is released at the main region in a state in which screen information corresponding to the second playlist is displayed in the extended region, the controller changes the second playlist instead of the first playlist as a current playback object.

12. The mobile terminal of claim 1, wherein the prescribed content is at least one of a video or an image, and at least one content is displayed in the main region, and
when a drag touch started from any one content among the at least one content displayed in the main region is released at the extended region, a thumbnail corresponding to the any one content is displayed in the extended region.

13. The mobile terminal of claim 12, wherein when a drag touch started from the extended region is released at the main region in a state in which at least one thumbnail is displayed in the extended region, the controller displays a content corresponding to the at least one thumbnail in the main region.

14. The mobile terminal of claim 13, wherein a content corresponding to at least one thumbnail displayed in the extended region is grouped into one group.

15. The mobile terminal of claim 14, wherein the grouping is carried out subsequent to the drag touch that starts from the extended region and released at the main region.

16. The mobile terminal of claim 13, wherein when a drag touch started from the extended region is released at a region other than the extended region and the main region in a state in which at least one thumbnail is displayed in the extended region, the controller deletes a content corresponding to the at least one thumbnail or limits the display of the at least one thumbnail based on a direction of the drag touch.

17. The mobile terminal of claim 16, wherein the controller controls a display of at least one thumbnail to be restricted in the extended region based on a drag touch started from a position outside the extended region being released at the extended region in a state in which the display of the at least one thumbnail is restricted, and
wherein at least one thumbnail that is restricted in access is displayed in the extended region when a user authentication is successful.

18. The mobile terminal of claim 1, wherein the display module includes a main light source coupled to a main light guide and an auxiliary light source coupled to an auxiliary light guide and separate from the main light source and main light guide,
wherein the main light source and the main light guide correspond to the main region of the display module and the auxiliary light source and the auxiliary light guide correspond to the extended region of the display module.

19. A method of controlling a mobile terminal, the method comprising:
displaying screen information associated with a prescribed content in a display module that includes a main region and an extended region that extends in at least one direction from the main region; and
controlling the prescribed content in a different mode based on a region to which a predetermined type of touch is sensed among the main region and the extended region,
wherein the controlling step controls the prescribed content in a first mode based on the predetermined type of touch sensed at the main region, and controls the prescribed content in a second mode different from the first mode based on the predetermined type of touch sensed at the extended region,
wherein screen information associated with a content different from the prescribed content is displayed on the display module based on the predetermined type of touch sensed at any one region of the main region and the extended region, and
wherein when the predetermined type of touch is sensed at the extended region, the controlling step displays screen information associated with the different content in the main region and the extended region in a state in which the playback of the prescribed content is maintained.

* * * * *